US012098851B2

(12) United States Patent
Abe et al.

(10) Patent No.: US 12,098,851 B2
(45) Date of Patent: Sep. 24, 2024

(54) COMPOSITE ARTICLE FOR INSULATING APPLIANCE, APPLIANCE COMPRISING COMPOSITE ARTICLE, AND RELATED METHOD

(71) Applicants: DOW BRASIL SUDESTE INDUSTRIAL LTDA., São Paulo (BR); DOW GLOBAL TECHNOLOGIES LLC, Midland, MI (US)

(72) Inventors: Rodnei M. Abe, São Paulo (BR); Carlos Adami, São Paulo (BR); Paulo Altoé, São Paulo (BR)

(73) Assignees: DOW BRASIL SUDESTE INDUSTRIAL LTDA., SãPaulo (BR); DOW GLOBAL TECHNOLOGIES LLC, Midland, MI (US)

( * ) Notice: Subject to any disclaimer, the term of this patent is extended or adjusted under 35 U.S.C. 154(b) by 546 days.

(21) Appl. No.: 17/418,367

(22) PCT Filed: Dec. 23, 2019

(86) PCT No.: PCT/US2019/068253
§ 371 (c)(1),
(2) Date: Jun. 25, 2021

(87) PCT Pub. No.: WO2020/139805
PCT Pub. Date: Jul. 2, 2020

(65) Prior Publication Data
US 2022/0065464 A1    Mar. 3, 2022

Related U.S. Application Data

(60) Provisional application No. 62/785,839, filed on Dec. 28, 2018.

(51) Int. Cl.
*F24C 15/34* (2006.01)
*A47L 15/42* (2006.01)
(Continued)

(52) U.S. Cl.
CPC .......... *F24C 15/34* (2013.01); *A47L 15/4209* (2016.11); *B29C 44/06* (2013.01);
(Continued)

(58) Field of Classification Search
CPC ..... A47L 15/4209; B29C 44/06; B29C 44/14; B29K 2075/00; B29K 2083/00;
(Continued)

(56) References Cited

U.S. PATENT DOCUMENTS 4,287,245 A    9/1981  Kikuchi
4,992,481 A    2/1991  von Bonin et al.
(Continued)

FOREIGN PATENT DOCUMENTS

AU    640936 B2    1/1991
CA    2430817 A1    12/2003
(Continued)

OTHER PUBLICATIONS

Machine assisted English translation of JPS56156598A obtained from https://worldwide.espacenet.com on Nov. 9, 2023, 4 pages.
(Continued)

*Primary Examiner* — Hai Vo
(74) *Attorney, Agent, or Firm* — Warner Norcross + Judd LLP

(57) ABSTRACT

A composite article and a method for insulating an appliance are disclosed. In general, the appliance is selected from the group of major, domestic or household appliances (e.g. ovens, stoves, ranges, etc.). The appliance has a first surface that defines a heating cavity, and a second surface opposite the first surface. The composite article comprises a backing
(Continued)

layer spaced from the first surface, and an insulating layer sandwiched between the second surface and the backing layer. The insulating layer reduces heat transfer from the heating cavity to the backing layer (e.g. during use of the appliance). The insulating layer comprises a foamed silicone. The foamed silicone can be one formed via a hydrosilylation-curable silicone composition, a condensation-curable silicone composition, or a combination thereof. The insulating layer may comprise a foamed room-temperature-vulcanizing (RTV) silicone. The backing layer comprises a foamed polyurethane (PUR), a foamed polyisocyanurate (PIR), or a foamed PUR/PIR hybrid.

15 Claims, 4 Drawing Sheets

(51) Int. Cl.

| | | |
|---|---|---|
| B29C 44/06 | (2006.01) | |
| B29C 44/14 | (2006.01) | |
| B29K 75/00 | (2006.01) | |
| B29K 83/00 | (2006.01) | |
| B29K 105/04 | (2006.01) | |
| B29L 31/00 | (2006.01) | |
| C08G 18/08 | (2006.01) | |
| C08G 77/12 | (2006.01) | |
| C08G 77/16 | (2006.01) | |
| C08G 77/20 | (2006.01) | |
| C08J 9/36 | (2006.01) | |
| F24H 1/18 | (2022.01) | |

(52) U.S. Cl.
CPC .............. *B29C 44/14* (2013.01); *C08G 18/14* (2013.01); *C08G 77/12* (2013.01); *C08G 77/16* (2013.01); *C08G 77/20* (2013.01); *C08J 9/365* (2013.01); *F24H 1/182* (2013.01); *B29K 2075/00* (2013.01); *B29K 2083/00* (2013.01); *B29K 2105/04* (2013.01); *B29K 2995/0015* (2013.01); *B29K 2995/0063* (2013.01); *B29L 2031/762* (2013.01); *C08G 2110/0025* (2021.01); *C08G 2110/0058* (2021.01); *C08G 2330/00* (2013.01); *C08J 2201/026* (2013.01); *C08J 2207/00* (2013.01); *C08J 2383/06* (2013.01); *C08J 2383/07* (2013.01); *C08J 2475/04* (2013.01)

(58) Field of Classification Search
CPC ........ B29K 2105/04; B29K 2995/0015; B29K 2995/0063; B29L 2031/762; B32B 1/00; B32B 15/046; B32B 15/18; B32B 2250/02; B32B 2250/03; B32B 2250/22; B32B 2255/06; B32B 2255/205; B32B 2255/26; B32B 2255/28; B32B 2266/0214; B32B 2266/0278; B32B 2266/08; B32B 2307/304; B32B 2307/306; B32B 2307/308; B32B 2307/72; B32B 2457/00; B32B 2509/00; B32B 5/20; B32B 5/32; B32B 7/027; C08G 18/14; C08G 18/225; C08G 18/4018; C08G 18/7664; C08G 2110/0025; C08G 2110/0058; C08G 2330/00; C08G 77/12; C08G 77/16; C08G 77/20; C08J 2201/026; C08J 2203/14; C08J 2207/00; C08J 2383/04; C08J 2383/06; C08J 2383/07; C08J 2475/04; C08J 9/141; C08J 9/365; C08K 5/56; C08L 83/00; C08L 83/04; F24C 15/34; F24H 1/182; H05B 6/6402
See application file for complete search history.

(56) References Cited

U.S. PATENT DOCUMENTS

| | | |
|---|---|---|
| 5,215,073 A | 6/1993 | Wilson |
| 5,219,648 A | 6/1993 | Morimoto et al. |
| 6,084,002 A | 7/2000 | Nicholson et al. |
| 6,183,855 B1 | 2/2001 | Buckley |
| 6,905,332 B1 | 6/2005 | Neal et al. |
| 7,064,173 B2 | 6/2006 | Rubinsztajn et al. |
| 7,829,003 B2 | 11/2010 | Debiasi et al. |
| 7,959,839 B2 | 6/2011 | Debiasi et al. |
| 8,101,702 B2 | 1/2012 | Mohamed |
| 8,623,265 B2 | 1/2014 | Simpson |
| 9,097,011 B1 | 8/2015 | Barone et al. |
| 9,920,202 B2 | 3/2018 | Mente |
| 2003/0098598 A1 | 5/2003 | English et al. |
| 2010/0003484 A1* | 1/2010 | Blanc .......................... C08J 9/02 521/86 |
| 2010/0069517 A1 | 3/2010 | Swab et al. |
| 2011/0168217 A1* | 7/2011 | Neff ..................... C08G 18/797 428/36.5 |
| 2015/0232630 A1 | 8/2015 | Lindner et al. |
| 2015/0344611 A1* | 12/2015 | Kramer .............. C08G 18/4018 264/46.5 |
| 2018/0049618 A1 | 2/2018 | Lista et al. |

FOREIGN PATENT DOCUMENTS

| | | |
|---|---|---|
| CN | 1339044 A | 3/2002 |
| CN | 102300891 A | 12/2011 |
| CN | 104294941 A | 1/2015 |
| CN | 104703768 A | 6/2015 |
| EP | 0051865 B1 | 7/1986 |
| EP | 0253221 A2 | 1/1988 |
| EP | 0490389 B1 | 6/1996 |
| EP | 0476058 B1 | 3/2002 |
| JP | S56156598 A | 12/1981 |
| JP | H11241428 A | 9/1999 |
| KR | 101832872 B1 | 2/2018 |
| WO | 1990014944 A1 | 12/1990 |
| WO | 2010016834 A1 | 2/2010 |
| WO | 2010088198 A1 | 8/2010 |
| WO | 2014008322 A1 | 1/2014 |
| WO | 2016153664 A1 | 9/2016 |
| WO | 2017066832 A1 | 4/2017 |

OTHER PUBLICATIONS

International Search Report for PCT/US2019/068253 dated Mar. 18, 2020, 5 pages.
Database WPI, Week 201819, Thomson Scientific, London, GB; AN 2018-19568V, XP002798232, 1 page.
Machine assisted English translation of KR101832872B1 obtained from https://patents.google.com/patent on Sep. 29, 2021, 8 pages.
Machine assisted English translation of EP0051865B1 obtained from https://patents.google.com/patent on Sep. 29, 2021, 8 pages.
Machine assisted English translation of JPH11241428A obtained from https://patents.google.com/patent on Sep. 29, 2021, 9 pages.
Product Information sheet for DOW CORNING® Firestop 3-6548 Silicone RTV Foam, dated May 28, 2001, 4 pages.
Machine assisted English translation of CN104294941A obtained from https://patents.google.com/patent on Mar. 14, 2023, 5 pages.

* cited by examiner

COMPOSITE ARTICLE FOR INSULATING APPLIANCE, APPLIANCE COMPRISING COMPOSITE ARTICLE, AND RELATED METHOD

CROSS-REFERENCE TO RELATED APPLICATIONS

This application is the National Stage of International Appl. No. PCT/US2019/068253 filed on 23 Dec. 2019, which claims priority to and all advantages of U.S. Provisional Patent Application No. 62/785,839 filed on 28 Dec. 2018, the content of which is incorporated herein by reference.

FIELD OF THE INVENTION

This disclosure relates to composite articles for insulating appliances, and in particular, to composite articles comprising an insulating layer and a backing layer, to appliances comprising composite articles, and to methods of forming composite articles and insulating appliances. The composite articles provide desirable physical properties, such as reduced heat transfer between appliances and surroundings. The composite articles also provide reduced manufacturing costs.

DESCRIPTION OF THE RELATED ART

Glass wool or mineral wool, more so glass wool, has historically been used for insulation of appliances, such as ovens, stoves or ranges. Glass wool may also be referred to as fiberglass, and mineral wool may also be referred to as mineral cotton, rock wool, stone wool or slag wool (collectively "wools"). Wools are useful for thermal insulation of appliances to reduce heat transfer from appliances to surroundings (or vice versa). Oftentimes, wools used for appliances are in the form of blankets (or batts) for ease of transport, storage and handling.

Unfortunately, wools and blankets formed therefrom suffer from a number of problems, including irritation by fibers thereof via breathing them in, skin contact or eye contact. Thus, personal protective equipment ("PPE"), e.g. gloves and masks, is often required. In addition, compressing the blanket reduces its effectiveness, and cutting the blanket into a desired shape can be difficult, which leads to gaps that reduce effectiveness of the blanket. In general, proper installation of the blanket must be done manually, which is time and labor intensive. This, along with use of PPE, increases manufacturing costs of appliances relying on such insulation means.

Moreover, the blanket is prone to movement during later manufacturing steps, shipping, handling, or servicing of the appliance. If the blanket is displaced or compressed, effectiveness is reduced. In addition, if the blanket is displaced, compressed or removed, excess heat generated during use of the appliance may pose a burn or fire risk.

In view of the foregoing, there remains an opportunity to provide improved composite articles for insulating appliances. In addition, there remains an opportunity to provide improved methods of forming and utilizing such composite articles. Moreover, there remains an opportunity to provide improved appliances utilizing such composite articles.

SUMMARY OF THE INVENTION

This disclosure relates to a composite article for insulating an appliance. In addition, this disclosure relates to a method of insulating an appliance. Moreover, this disclosure relates to an appliance comprising a composite article.

The appliance has a first surface that defines a cavity, generally a heating cavity (e.g. when the appliance is in use). The appliance also has a second surface opposite the first surface. In various embodiments, the appliance is selected from the group of major, domestic or household appliances (e.g. ovens, stoves, ranges, etc.). The composite article of this disclosure can be used to insulating the appliance.

The composite article comprises a backing layer spaced from the first surface, and an insulating layer sandwiched between the second surface and the backing layer. The insulating layer reduces heat transfer from the heating cavity to the backing layer (e.g. during use of the appliance). In various embodiments, the backing layer is adhered to the insulating layer and/or the insulating layer is adhered to the second surface.

The insulating layer comprises a foamed silicone. In various embodiments, the foamed silicone is one formed via a hydrosilylation-curable silicone composition, a condensation-curable silicone composition, or a combination thereof. In certain embodiments, the insulating layer comprises a foamed room-temperature-vulcanizing ("RTV") silicone. In specific embodiments, the RTV silicone is based on a two-part silicone RTV foam formulation.

The backing layer comprises a foamed polyurethane ("PUR"), a foamed polyisocyanurate ("PIR"), or a foamed PUR/PIR hybrid. In certain embodiments, the backing layer comprises a foamed PUR or a foamed PIR. In various embodiments, the composite article may be referred to as a hybrid silicone and PUR/PIR foam, which is useful for high temperature (e.g. ≥100° C.) insulation. As used herein, "PUR/PIR" may refer to PUR alone, PIR alone, or a combination of PUR and PIR.

In various embodiments, the insulating layer has a density of from 100 to 500 kg/m³ and/or a thermal conductivity of from 0.05 to 0.1 W/m·K. In further or alternate embodiments, the backing layer has a density of from 20 to 100 kg/m³ and/or a thermal conductivity of from 0.005 to 0.04 W/m·K. In certain embodiments, the insulating layer ("IL") and the backing layer ("BL") have a combined average thickness ratio (IL:BL) of at least 1:2.

The method of this disclosure comprises applying a first composition to the second surface to form an insulating layer thereon. The method further comprises applying a second composition to the insulating layer to form a backing layer thereon. The insulating and backing layers are as described above.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views, a composite article in accordance with the present disclosure is shown generally at 20. The composite article 20 may be referred to herein as the article 20 or the composite 20.

Figure 1:
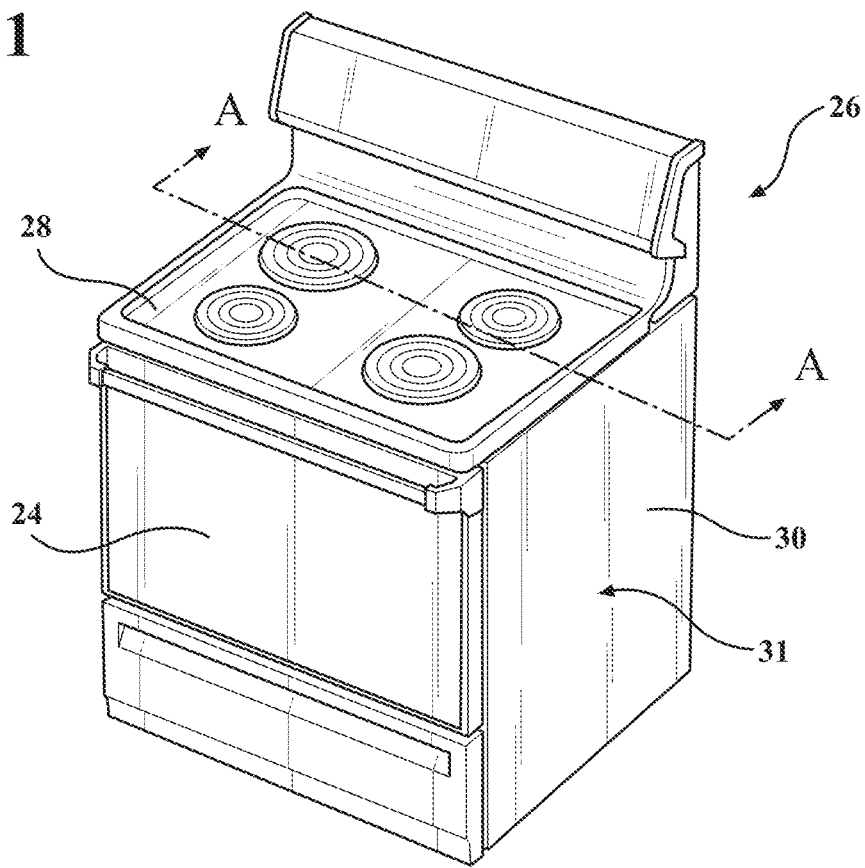
FIG. 1 a perspective view of a range having a stove and an oven.
Figure 2:
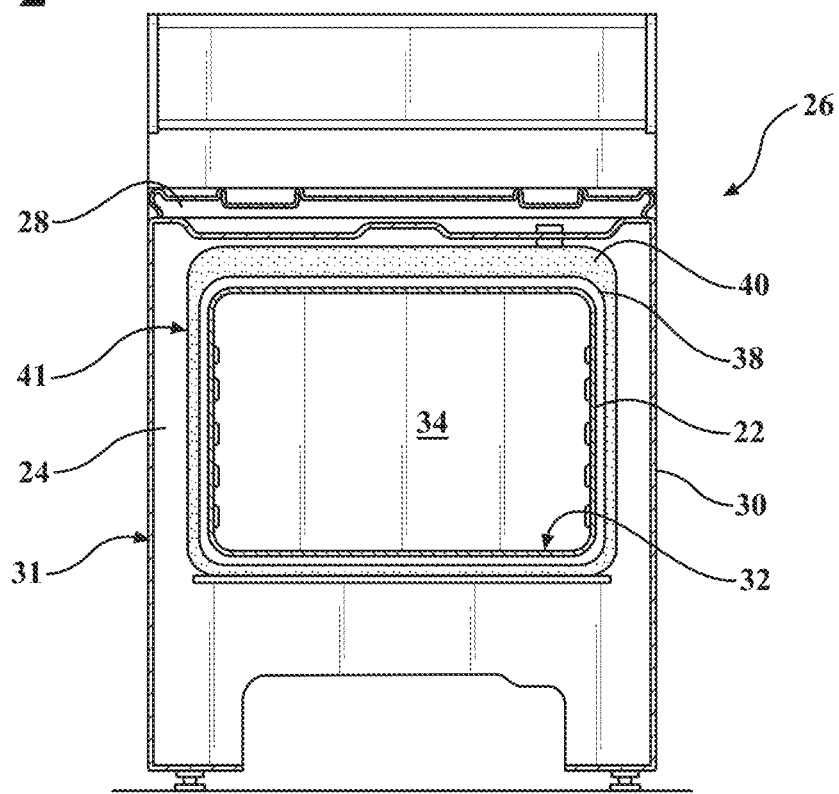
FIG. 2 is a cross-sectional front view of the range of FIG. 1 taken along line A-A.
Figure 3:
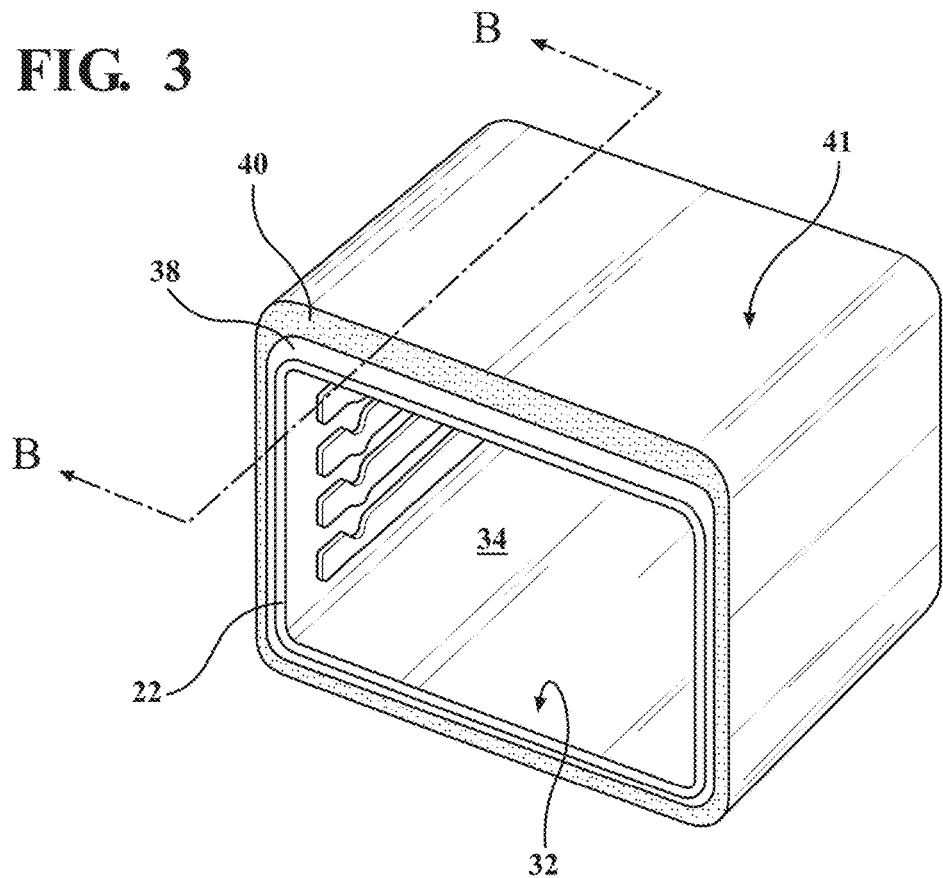
FIG. 3 is a perspective view of a liner comprising a composite article in accordance with the present disclosure.

In one embodiment, as shown in FIGS. 2 and 3, the article 20 covers at least a portion of a liner 22 of an oven 24. The oven 24 is part of a range 26, which also has a stove 28. The range 26 is best shown in FIG. 1.

While the article 20 is shown covering the liner 22, it is to be appreciated that in other embodiments, the article 20 may be used for insulating other surfaces and/or assemblies, such as those found in major, domestic or household appliances. In general, the article 20 is useful on any surface or assembly where it is desired to provide thermal insulation of the surface or assembly. In various embodiments, the surface or assembly is associated with a household appliance.

Examples of appliances include, but are not limited to, cooking equipment such as ovens, stoves (or cooktops), ranges, and microwaves; washing and drying equipment such as dishwashers, washing machines, clothes dryers, and drying cabinets; and heating equipment such as water heaters and boilers.

In certain embodiments, the appliance is selected from the group of cooking equipment. It is thought that the article 20 of this disclosure is especially suited for such appliances given typical operating or use temperatures, which can be in excess of 100° C., in excess of 200° C., or higher. In specific embodiments, the appliance is an oven, a stove or a range. As understood in the art, ranges are generally a combination of a stove and an oven. As used herein, reference to the range 26 may be interchangeable with one of the other appliances described above. The range 26 is illustrated in various Figures merely for ease of description. In other words, it is to be appreciated that the article 20 is not limited to ranges or to ranges of the type specifically illustrated herein or in the Figures.

The appliance may be free-standing (or standalone) or slide-in (or built-in). In certain embodiments, the appliance is free-standing. The range 26 in FIG. 1 is free-standing, and includes a skin 30 having a show surface 31. The article 20 is disposed between the liner 22 and skin 30. The skin 30 generally comprises a rigid material such as a metal. Examples of metals include, but are not limited to, galvanized or stainless steel. The show surface 31 may include a coating (e.g. a clear coat or basecoat paint) or other functional or aesthetic features.

In other embodiments (not shown), the appliance is slide-in. Slide-in appliances generally lack a skin and thus lack a show surface (or may have only a partial skin), instead relying on surrounding wall, counter and/or cabinetry to retain the appliance. In these embodiments, the article 20 is generally covered by and disposed between the liner 22 and surrounding wall, counter and/or cabinetry once the appliance is installed.

It is thought that the article 20 of this disclosure is especially useful for appliances that have closed systems, such as those that rely on electricity. However, the article 20 may also be used for appliances that have open systems, or partially-open systems, such as those that rely on gas (e.g. natural gas or propane gas).

Referring to FIGS. 2 and 3, the liner 22 includes a first surface 32 that defines a heating cavity 34 and a second surface 36 opposite the first surface 32. The liner 22, and thus each of the surfaces 32, 36, generally comprises a rigid material such as a metal. Examples of metals include, but are not limited to, galvanized or stainless steel. The first surface 32 can include a coating, such as an enamel coating (e.g. an acrylic enamel or pyrolytic ground coat enamel). The second surface 36 may have also have a coating, such as one that promotes adhesion with the article 20. Otherwise, the second surface 36 may be free of a coating, e.g. be bare metal. In other embodiments, the second surface 36 may have a conventional coating understood in the art, such as one that prevents premature corrosion of the second surface 36.

Figure 4:
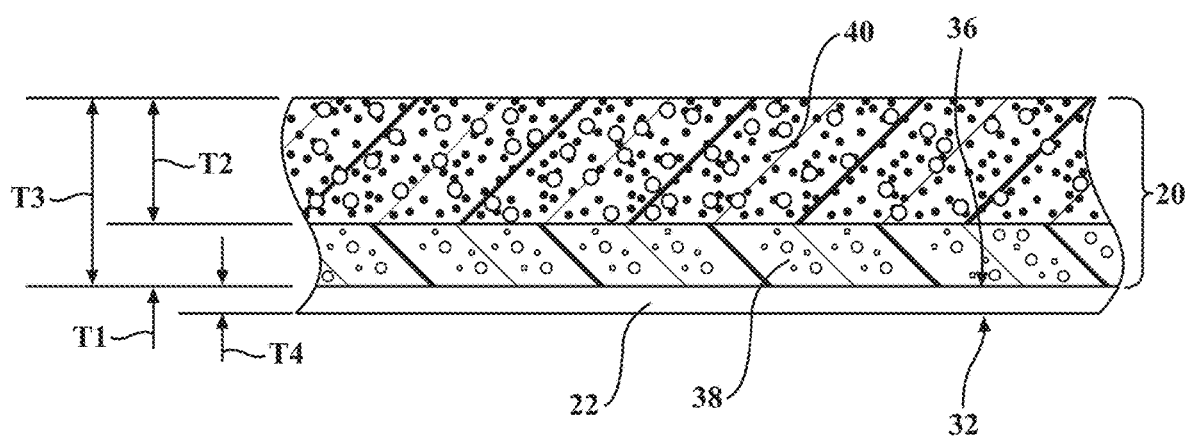
FIG. 4 is a partial cross-sectional side view of the liner and composite article of FIG. 3 taken along line B-B.

Referring to FIG. 4, the backing layer 40 is spaced from the first surface 32, and the insulating layer 38 is sandwiched between the second surface 36 and the backing layer 40. The backing layer 40 has an outer surface 41. While referred to as the backing layer 40, the backing layer 40 also serves as an insulating layer different from the insulating layer 38.

In certain embodiments, the insulating layer 38 is adhered to the second surface 36, and the backing layer 40 is adhered to the insulating layer 38. In these embodiments, the layers 38, 40 are generally in direct contact. In further embodiments, the insulating layer 38 is in direct contact with the second surface 36. In other embodiments (not shown), there is one or more intervening layers between the insulating layer 38 and second surface 36 and/or between the layers 38, 40.

In various embodiments, the appliance is substantially to completely free of supplemental insulation adjacent the backing layer 40, e.g. proximal or in contact with the outer surface 41 of the backing layer 40, opposite the heating cavity 34. Examples of supplemental insulation include, but are not limited to, glass wool and mineral wool. As shown in FIG. 2, the skin 30 is disposed about at least a portion of the article 20 opposite the second surface 36. The article 20 and skin 30 may be spaced to define a void or space therebetween (e.g. filled with air), the article 20 and skin 30 may be in contact at one or more places, or the article 20 may substantially abut the skin 30 thus minimizing or preventing any void(s) and/or space(s) therebetween.

The insulating layer 38 is generally a closed-cell foam (e.g. >50% closed cells). In various embodiments, the insulating layer 38 has a density of from 100 to 500 kg/m$^3$, optionally 150 to 450 kg/m$^3$, or optionally 200 to 400 kg/m$^3$. In general, the backing layer 40 is also a closed-cell foam. In various embodiments, the backing layer 40 has a density of from 20 to 100 kg/m$^3$, optionally 25 to 80 kg/m$^3$, or optionally 30 to 60 kg/m$^3$. Density of each foam can be determined via methods understood in the art. For example, density of each foam can be measured via the Archimedes principle, using a balance and density kit, and following standard instructions associated with such balances and kits. An example of a suitable balance is a Mettler-Toledo XS205DU balance with density kit.

In various embodiments, the insulating layer 38 has a thermal conductivity of from 0.05 to 0.1 W/m·K, optionally 0.06 to 0.095 W/m·K, or optionally 0.07 to 0.09 W/m·K. In various embodiments, the backing layer 40 has a thermal conductivity of from 0.005 to 0.04 W/m·K, optionally 0.01 to 0.035 W/m·K, or optionally 0.015 to 0.03 W/m·K. Thermal conductivity of each foam can be determined via methods understood in the art. For example, thermal conductivity of each foam can be measured via ASTM C518—Standard Test Method for Steady-State Thermal Transmission Properties by Means of the Heat Flow Meter Apparatus.

In various embodiments, the insulating layer 38 has an average thickness (T1) of at least 2 mm, optionally at least 5 mm and/or less than 5 cm, or optionally of from 2.5 to 25 mm. Thickness (T1) of the insulating layer 38 may be uniform or vary. In various embodiments, the backing layer 40 has an average thickness (T2) of at least 0.4 mm, optionally at least 10 mm and/or less than 10 cm, or optionally of from 0.5 to 25 mm. Thickness (T2) of the backing layer 40 may be uniform or vary. Thickness (T4) of the liner 22 is not limited and can be conventional to the oven 24 or range 26.

One of skill in the art appreciates that depending on configuration of the appliance, it may be desirable to increase thickness (T1, T2) of one or both of the layers 38, 40 in some areas of the appliance to account for "hot" zones. For example, conventional ranges often have a glass wool blanket of greater thickness above the oven and below the stove relative to thickness of the blanket at the sides and/or rear of the oven. In addition, conventional ranges may omit glass wool blanket below the oven. The composite 20 of this disclosure may emulate such conventional blanket placements/location, or may be used in alternate ways. For example, thickness (T3; T1+T2) of the composite 20 may be uniform or may vary. In addition, thickness (T3) of the composite 20 may be less than thickness of conventional blankets. The composite 20 may be used above, at the back of, on the sides of, and/or below, the oven 24. The composite 20 may also be used in the front/door of the oven 24 or range 26.

In various embodiments, the insulating layer 38 (IL) and the backing layer 40 (BL) have an average thickness ratio (IL:BL) of at least 1:2, optionally of from 1:2 to 1:10, or optionally 1:3 to 1:5. For example, the insulating layer 38 can be 5 mm thick (T1) and the backing layer 40 can be 20 mm thick (T2), presenting an average thickness ratio (IL:BL) of 1:4.

The article 20 has low thermal conductance, thus making it useful as thermal insulation of the appliance. Specifically, without being bound or limited to any specific theory, it is thought that due to its insulation properties and high temperature resistance, the insulating layer 38 can drastically reduce temperature between the second surface 36 and the backing layer 40, such that the backing layer 40 can withstand the reduced temperature for a longer period of time (or for periods of time conventional to use of the appliance). For example, if the heating cavity 34 of the oven 24 is at 240° C., the insulating layer 38 reduces temperature down such that at the interface between the layers 38, 40, the backing layer 40 will be at a temperature ≤100° C., which the backing layer 40 can withstand for extended periods of time. The backing layer 40 then reduces temperature down such that the range 26 does not pose a burn or fire risk via the skin 30 (or article 20). In addition, the article 20 can protect other parts of the appliance from high heat conditions. For example, newer ovens and ranges often include circuit boards, which may be damaged if exposed to high temperatures, especially those associated with broiling or self-cleaning settings, which typically approach 300° C. and 500° C., respectively (although generally for a shorter period of time relative to normal cooking temperatures/times). Energy savings can also be realized via low thermal conductance of the article 20. For example, the article 20 can better retain heat within the appliance, which reduces energy usage not only for maintaining a desired use temperature of the appliance, but also reduces undesirable heating of the appliance's surroundings. While rarely an issue with appliances of this sort, the article 20 may also slow or prevent penetration of fire, smoke, and/or gas in instances of appliance malfunction or misuse (at least for a period of time relative to absence of the article 20).

Figure 5:
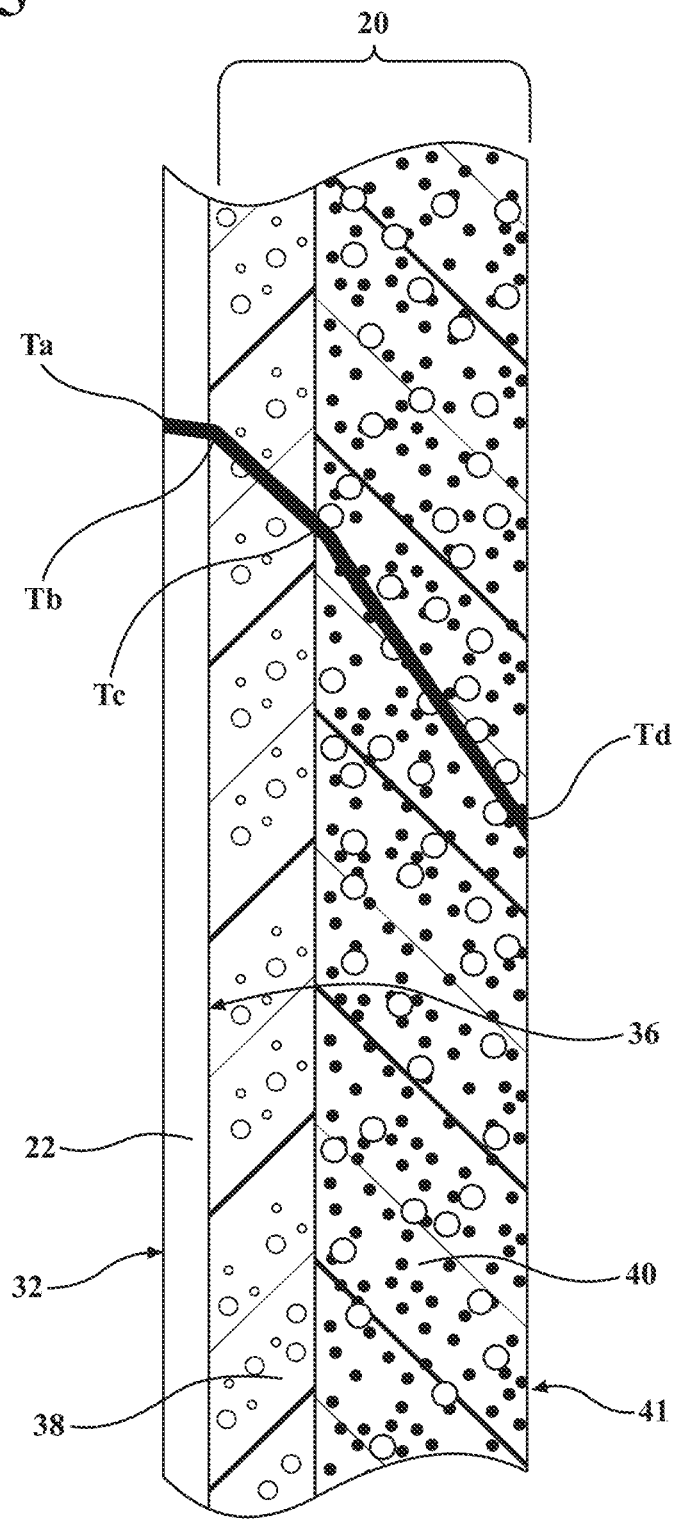
FIG. 5 is a partial cross-sectional side view of the liner and composite article illustrating a temperature gradient of the composite article.

FIG. 5 illustrates a temperature gradient during use of the appliance, e.g. oven 24, where the first surface 32 of the liner 22 is at first temperature (Ta) imparted at least in part by temperature of the heating cavity 34, the second surface 36 of the liner 22 is at a second temperature (Tb), the interface between the layers 38, 40 is at a third temperature (Tc), and the outer surface 41 of the backing layer 40 is at a fourth temperature (Td) which can be imparted at least in part by ambient temperature. In general, (Ta)>(Tb)>(Tc)>(Td) when the appliance is in use. For example, as exemplified above, (Ta) can be ~240° C. and (Tc) can be ≤100° C. It is to be appreciated that the temperature gradient defined by (Ta) to (Td) will vary depending on the difference between (Ta) and (Td). For example, the temperature gradient may be of varying slopes depending, e.g. on temperature of the heating cavity 34, or may be substantially flat, i.e., (Ta)~(Td) or (Ta)=(Td), when the appliance is not in use.

Method

As introduced above, the first composition is applied to the second surface 36 to form the insulating layer 38 thereon. In addition, the second composition is applied to the insulating layer 38 to form the backing layer 40 thereon. Each of the first and second compositions is described in greater detail below.

Figure 6:
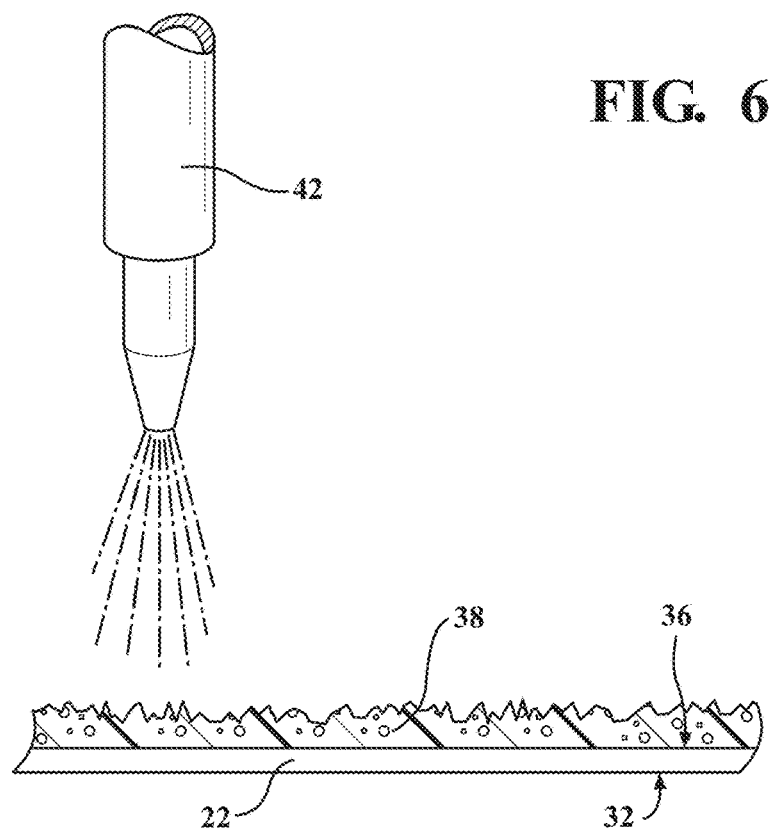
FIG. 6 is a partial cross-sectional side view illustrating a step of applying a first composition to form a backing layer on the liner.

The first composition may be applied via any suitable manner understood in the art. For example, the first composition may be applied by spraying, pouring, sheeting, dipping, or reactive injecting into a mold-cavity (e.g. via reactive-injection-molding or "RIM"). FIG. 6 shows a spray nozzle 42 applying the first composition onto the second surface 36 to form the insulating layer 38. The first composition can be formed prior to entering, while in, and/or after exiting, the spray nozzle 42. In various embodiments, the first composition is thixotropic, which allows for application to vertical surfaces, in addition to horizontal surfaces and surfaces between vertical and horizontal. The first composition may be applied at elevated or room temperature, depending, for example, on the chemistry of the first composition. For some formulations described further below, heating of the first composition can accelerate cure and/or foaming thereof. Heat can be applied directly and/or indirectly.

Figure 7:
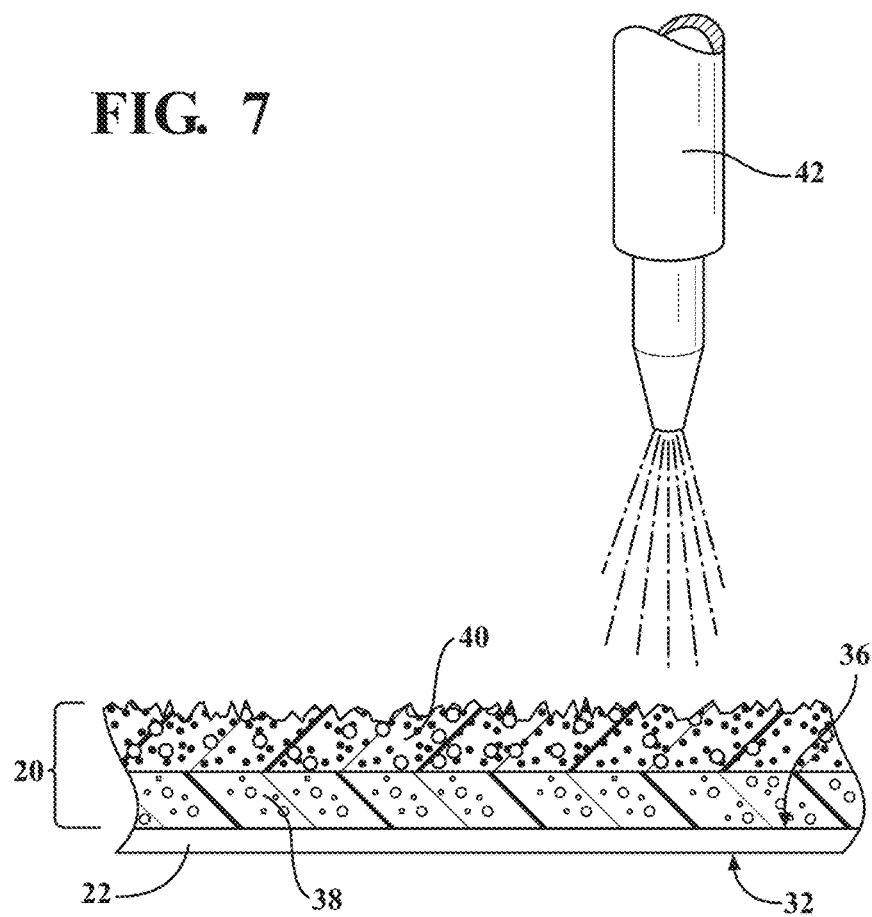
FIG. 7 is a partial cross-sectional side view illustrating a step of applying a second composition to form an insulating layer on the backing layer

The second composition may be applied via any suitable manner understood in the art. For example, the second composition may be applied by spraying, pouring, sheeting, dipping, or reactive injecting into a mold-cavity (e.g. via RIM). FIG. 7 shows a spray nozzle 42 applying the second composition onto the insulating layer 38 to form the backing layer 40. The second composition can be formed prior to entering, while in, and/or after exiting, the spray nozzle 42. In various embodiments, the second composition is thixotropic, which allows for application to vertical surfaces, in addition to horizontal surfaces and surfaces between vertical and horizontal. The second composition may be applied at elevated or room temperature, depending, for example, on the chemistry of the second composition. For some formulations described further below, heating of the second composition can accelerate cure and/or foaming thereof. Heat can be applied directly and/or indirectly.

In certain embodiments, the second composition is applied via use of a mold (not shown). The mold may be any suitable mold, such as an open or a closed-type mold. In addition, the mold may be formed from any suitable material, e.g. a metallic material. The mold includes a surface that defines a mold-cavity. In these embodiments, the liner 22 is placed into the mold-cavity, either after or before application of the first composition, generally after (e.g. after spraying), and the second composition is injected or otherwise applied. For example, an impinging mixer can be used for the second composition to form the backing layer 40. Other suitable types of application devices and methodologies are understood in the art. Some of these are described further below.

Optionally, a mold release agent may be introduced to the surface of the mold prior to the step of applying the second composition into the mold-cavity. The mold release agent may be introduced to the surface of the mold by any suitable manner understood in the art, such as by spraying. The mold release agent may be selected from the group of silicones, soaps, waxes, solvents and combinations thereof. The mold release agent may be used to facilitate the removal of the article 20 from the mold-cavity.

In many embodiments, the second composition is formed via a resin component and an isocyanate component. Such components are understood by those in the PUR/PIR art. In certain embodiments, the resin component and the isocyanate component are separately stored in tanks until use. The resin and isocyanate components are mixed in a foam dispensing apparatus and are dispensed therefrom as polyurethane foam. The tanks storing the resin component and the isocyanate component and the foam dispensing apparatus are pressurized to drive the resin and isocyanate components from the tanks and through the foam dispensing apparatus. In various embodiments, the tanks and the foam dispensing apparatus are pressurized by either a low pressure system or a high pressure system.

The low pressure system uses gas pressure to pressurize the tanks and the foam dispensing apparatus. In certain embodiments, the low pressure system operates in a pressure range of 100 to 500 psi (pounds per square inch; where 1 lb/in$^2$ is ~6895 N/m$^2$) and creates a flow rate of from 0.4 to 5 gpm (gallons per minute; where 1 gal/min is ~3.79 L/min) for each of the resin and isocyanate components, i.e., the low pressure system can dispense PUR/PIR foam at a flow rate of 6 to 10 gpm. The high pressure system operates in a pressure range of 1500 to 6000 psi and creates a flow rate of each of the resin and isocyanate components of 4 to 50 gpm, i.e., the high pressure system can dispense PUR/PIR foam at 8 to 100 gpm. One of skill in the art can pick a particular pressure system for application contingent, e.g., on desired properties of the second composition and foams formed therefrom. Other systems understood in the art may also be utilized.

For free-standing appliances, such as the range 26, the skin 30 can be placed over the article 20 after formation of the article 20. In other embodiments (not shown), the skin 30 may act as a mold. For example, the insulating layer 38 can be formed on the liner 22, and the insulated liner 22, 38 can be placed for the appliance. The skin 30 can then be placed for the appliance. Next, the second composition can be applied to the insulating layer 38, e.g. via spraying and/or injecting, with the second composition foaming and expanding (yet retained by the skin 30) to form the backing layer 40 sandwiched between the insulating layer 38 and the skin 30.

It is to be appreciated that while FIG. 3 shows each of the layers 38, 40 at the front/face of the liner 22 for ease of reference, application of the second composition will substantially to completely cover the insulating layer 38 such that it may be encapsulated by the backing layer 40. In other words, the insulating layer 38 will generally not be visible after formation of the backing layer 40.

In certain embodiments, the second composition is applied while the insulating layer 38 is still wet ("wet-on-wet"). However, in many embodiments, the insulating layer 38 is cured or otherwise set to a generally hardened condition ("wet-on-dry") to prevent mixing or cross-contamination with the second composition. In some instances, "dryness" of the insulating layer 38 may be indicated by being substantially tack-free.

In various embodiments, the insulating layer 38 is allowed to cure for at least 60 seconds, optionally 60 seconds to 15 minutes, optionally 60 seconds to 10 minutes, or optionally 60 to 90 seconds, before application of the second composition.

In various embodiments, excellent adhesion can be achieved between the layers 38, 40. Specifically, it is thought that excellent adhesion is achieved via at least one of chemical and mechanical, or at least mechanical means. For example, chemical adhesion may be achieved where the first and second compositions have components that are reactive with one another, effectively "cross-linking" the layers 38, 40 together. Alternatively, the layers 38, 40 are mechanically adhered. For example, during expansion and formation of the backing layer 40 in the (closed) mold, the second composition will contact and penetrate the insulating layer 38, thus creating a mechanical bond between the layers 38, 40. In certain embodiments, asperities or "little bumps" protrude from the backing layer 40 into the insulating layer 38, which increases adhesion between the layers 38, 40, thereby minimizing separation or delamination thereof.

It is to be appreciated that respective bubble structures of the layers 38, 40 may be uniform or may vary. In addition, during formation of each layer 38, 40, bubbles may coalesce and/or collapse at surfaces, which can lead to improved adhesion (e.g. between the second surface 36 and insulating layer 38 and/or between the layers 38, 40) and/or lead to formation of an elastomeric skin such as the outer surface 41 of the backing layer 40.

In various embodiments, the backing layer 40 is allowed to cure for at least 60 seconds, optionally 60 seconds to 15 minutes, or optionally 60 seconds to 10 minutes, before handling of the composite 20. The first and second compositions will now be described in greater detail. First, general definitions are outlined below.

Definitions

As used herein, the term "ambient temperature" or "room temperature" refers to a temperature between about 15° C. and about 35° C., or alternatively about 20° C. and about 30° C. Usually, room temperature ranges from about 20° C. to about 25° C. The term "ambient pressure" or "atmospheric pressure" refers to a pressure of about 101 kPa.

All viscosity measurements referred to herein were measured at 25° C. unless otherwise indicated. Viscosity can be determined via methods understood in the art.

The following abbreviations have these meanings herein: "Me" means methyl, "Et" means ethyl, "Pr" means propyl, "Bu" means butyl, "g" means grams, and "ppm" means parts per million. In addition, "Vi" or "vi" means vinyl, and "Hex" or "hex" means hexenyl.

"Hydrocarbyl" means a monovalent hydrocarbon group which may be substituted or unsubstituted. Specific examples of hydrocarbyl groups include alkyl groups, alkenyl groups, alkynyl groups, aryl groups, aralkyl groups, etc.

"Alkyl" means an acyclic, branched or unbranched, saturated monovalent hydrocarbon group. Alkyl is exemplified by, but not limited to, Me, Et, Pr (e.g. iso-Pr and/or n-Pr), Bu (e.g. iso-Bu, n-Bu, tert-Bu, and/or sec-Bu), pentyl (e.g. iso-pentyl, neo-pentyl, and/or tert-pentyl), hexyl, heptyl, octyl, nonyl, decyl, undecyl, and dodecyl as well as branched saturated monovalent hydrocarbon groups of 6-12 carbon atoms. Alkyl groups may have 1-30, alternatively 1-24, alternatively 1-20, alternatively 1-12, alternatively 1-10, and alternatively 1-6, carbon atoms.

"Alkenyl" means an acyclic, branched or unbranched, monovalent hydrocarbon group having one or more carbon-carbon double bonds. Alkenyl is exemplified by, but not limited to, vinyl, allyl, methallyl, propenyl, and hexenyl. Alkenyl groups may have 2-30, alternatively 2-24, alternatively 2-20, alternatively 2-12, alternatively 2-10, and alternatively 2-6, carbon atoms.

"Alkynyl" means an acyclic, branched or unbranched, monovalent hydrocarbon group having one or more carbon-carbon triple bonds. Alkynyl is exemplified by, but not limited to, ethynyl, propynyl, and butynyl. Alkynyl groups may have 2-30, alternatively 2-24, alternatively 2-20, alternatively 2-12, alternatively 2-10, and alternatively 2-6, carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5-9, alternatively 6-7, and alternatively 5-6, carbon atoms. Polycyclic aryl groups may have 10-17, alternatively 10-14, and alternatively 12-14, carbon atoms.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

"Alkenylene" means an acyclic, branched or unbranched, divalent hydrocarbon group having one or more carbon-carbon double bonds. "Alkylene" means an acyclic, branched or unbranched, saturated divalent hydrocarbon group. "Alkynylene" means an acyclic, branched or unbranched, divalent hydrocarbon group having one or more carbon-carbon triple bonds. "Arylene" means a cyclic, fully unsaturated, divalent hydrocarbon group.

"Carbocycle" and "carbocyclic" each mean a hydrocarbon ring. Carbocycles may be monocyclic or alternatively may be fused, bridged, or spiro polycyclic rings. Monocyclic carbocycles may have 3-9, alternatively 4-7, and alternatively 5-6, carbon atoms. Polycyclic carbocycles may have 7-17, alternatively 7-14, and alternatively 9-10, carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl. "Cycloalkylene" means a divalent saturated carbocycle.

The term "substituted" as used in relation to another group, e.g. a hydrocarbyl group, means, unless indicated otherwise, one or more hydrogen atoms in the hydrocarbyl group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more. The term "branched" as used herein describes a polymer with more than two end groups.

M, D, T and Q units are generally represented as $R_u SiO_{(4-u)/2}$, where u is 3, 2, 1, and 0 for M, D, T, and Q, respectively, and R is an independently selected hydrocarbyl group. The M, D, T, Q designate one (Mono), two (Di), three (Tri), or four (Quad) oxygen atoms covalently bonded to a silicon atom that is linked into the rest of the molecular structure.

First Composition

The first composition may be referred to as a silicone composition. In various embodiments, the insulating layer 38 comprises the reaction product of: at least one of A) an organopolysiloxane having at least two silicon-bonded ethylenically unsaturated groups per molecule, and A') an organopolysiloxane having at least two silicon-bonded hydroxy groups per molecule; B) an organosilicon having at least two silicon-bonded hydrogen atoms per molecule; and C) a catalyst.

In certain embodiments, the first composition comprises component A). In further embodiments, the first composition comprises component A) and is substantially to completely free of component A'). In other embodiments, the first composition comprises component A'). In further embodiments, the first composition comprises component A') and is substantially to completely free of component A). These components and other optional components are described below.

In various embodiments, the silicone composition is selected from the group consisting of hydrosilylation-curable silicone compositions, condensation-curable silicone compositions, and combinations thereof. In these embodiments, the silicone composition is generally curable via exposure to a curing condition. As understood in the art, these silicone compositions may be cured via different curing conditions, such as exposure to heat, exposure to moisture, etc. In addition, exposure to a curing condition may cure or initiate cure of different types of silicone compositions. For example, heat may be utilized to cure or initiate cure of hydrosilylation-curable and condensation-curable silicone compositions. It is to be appreciated that the first composition may be a dual-cure system, having both hydrosilylation- and condensation-curable components. In these embodiments, the silicone composition may include a conventional catalyst for hydrosilylation-cure, condensation-cure, or both. One of skill in the art appreciates that hydrosilylation-curable silicone compositions may also be referred to as addition-curable silicone compositions. Such reactions and components thereof are understood in the art. For example, various condensation reactions, mechanisms and components thereof are illustrated in U.S. Pat. No. 7,064,173.

In various embodiments, at a temperature of 25° C., the first composition is typically a flowable liquid prior to reaction to form the insulating layer 38. Generally, the first composition has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25°

C. via a Brookfield LV DV-E viscometer, as understood in the art. If viscosity is too high, the first composition may be difficult to handle or apply.

As introduced above, in various embodiments, the insulating layer 38 comprises a foamed room-temperature-vulcanizing ("RTV") silicone. In certain embodiments, the insulating layer 38 comprises an addition curable RTV silicone.

Specific examples of suitable silicone foams, systems, compositions, formulations, and components thereof are commercially available from: The Dow Chemical Company under the trade names SILASTIC™ and DOWSIL™, such as SILASTIC™ 8257 Silicone Foam, DOWSIL™ 3-6548 RTV Silicone Foam, DOWSIL™ 3-8209 Silicone Foam, DOWSIL™ 3-8219 RF Silicone Foam, and DOWSIL™ 3-8259 RF Silicone Foam; Momentive Performance Materials Inc., such as Momentive RTF 7000 and Momentive RTF 8510; Wacker Chemie AG under the trade name ELASTOSIL®, such as ELASTOSIL® SC 835 A/B; Specified Technologies Inc. ("STI") under the trade name PEN-SIL®, such as PENSIL® PEN200 Silicone Foam; Elkem Silicones under the trade name BLUESIL™, such as BLUESIL™ FR 1593 A/B Foam; Rogers Corporation under the trade name BISCO®; and Silicone Solutions, such as SS-2001 Fire Barrier Silicone RTV Foam.

Hydrosilylation-Curable Compositions

In certain embodiments, the silicone composition comprises or is a hydrosilylation-curable silicone composition. In these embodiments, the hydrosilylation-curable silicone composition comprises or consists essentially of: A) the organopolysiloxane having at least two silicon-bonded ethylenically unsaturated groups per molecule; B) an organohydrogensiloxane having at least two silicon-bonded hydrogen atoms per molecule; and C) a hydrosilylation catalyst. In many embodiments, the hydrosilylation-curable silicone composition comprises at least one blowing agent.

Component A) includes at least two aliphatically unsaturated groups per molecule, which may alternatively be referred to as ethylenic unsaturation. Component A) is not limited and may be any unsaturated compound having at least two aliphatically unsaturated groups. In various embodiments, component A) has at least three silicon-bonded ethylenically unsaturated groups per molecule. In certain embodiments, component A) comprises a siloxane. In other embodiments, component A) comprises a silicone-organic hybrid, or an organosilicon compound. Various embodiments and examples of component A) are disclosed below.

The aliphatically unsaturated groups of component A) may be terminal, pendent, or in both locations in component A). For example, the aliphatically unsaturated group may be an alkenyl group and/or an alkynyl group. Alkenyl groups are exemplified by, but not limited to, vinyl, allyl, propenyl, and hexenyl. Alkynyl is exemplified by, but not limited to, ethynyl, propynyl, and butynyl.

In certain embodiments, component A) comprises an organopolysiloxane of the following average formula:

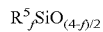

wherein each $R^5$ is an independently selected substituted or unsubstituted hydrocarbyl group with the proviso that in each molecule, at least two $R^5$ groups are aliphatically unsaturated groups, and wherein f is selected such that $0<f\leq 3.2$.

The average formula above for the organopolysiloxane may be alternatively written as $(R^5_3SiO_{1/2})_w(R^5_2SiO_{2/2})_x(R^5SiO_{3/2})_y(SiO_{4/2})_z$, where $R^5$ and its proviso is defined above, and w, x, y, and z are independently from $\geq 0$ to $\leq 1$, with the proviso that $w+x+y+z=1$. One of skill in the art understands how such M, D, T, and Q units and their molar fractions influence subscript f in the average formula above. T and Q units, indicated by subscripts y and z, are typically present in silicone resins, whereas D units, indicated by subscript x, are typically present in silicone polymers (and may also be present in silicone resins).

Each $R^5$ is independently selected, as introduced above, and may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group. Examples of substituted and unsubstituted hydrocarbyl groups are introduced above relative to R. Examples of aliphatically unsaturated group(s) are also introduced above.

In certain embodiments, the organopolysiloxane is substantially linear, alternatively is linear. In these embodiments, the substantially linear organopolysiloxane may have the average formula:

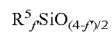

wherein each $R^5$ and its proviso are defined above, and wherein f' is selected such that $1.9\leq f'\leq 2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In specific embodiments in which the organopolysiloxane is substantially linear or linear, the organopolysiloxane may have the average formula:

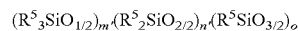

wherein each $R^5$ is independently selected and defined above (including the proviso that in each molecule, at least two $R^5$ groups are aliphatically unsaturated groups), and $m'\geq 2$, $n'\geq 2$, and $o\geq 0$. In specific embodiments, m' is from 2 to 10, alternatively from 2 to 8, alternatively from 2 to 6. In these or other embodiments, n' is from 2 to 1,000, alternatively from 2 to 500, alternatively from 2 to 200. In these or other embodiments, o is from 0 to 500, alternatively from 0 to 200, alternatively from 0 to 100.

When the organopolysiloxane is substantially linear, alternatively is linear, the silicon-bonded aliphatically unsaturated groups may be pendent, terminal or in both pendent and terminal locations. As a specific example of the organopolysiloxane having pendant silicon-bonded aliphatically unsaturated groups, the organopolysiloxane may have the average formula:

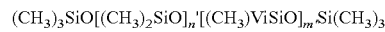

where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

$$\text{Vi}(CH_3)_2\text{SiO}[(CH_3)_2\text{SiO}]_{n'}\text{Si}(CH_3)_2\text{Vi}$$

where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, component A) may have the average formula:

$$\text{Vi}(CH_3)_2\text{SiO}[(CH_3)_2\text{SiO}]_{n'}[(CH_3)\text{ViSiO}]_{m'}\text{SiVi}(CH_3)_2$$

where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, component A) may be a resinous organopolysiloxane. In these embodiments, the resinous organopolysiloxane may have the average formula:

$$R^5_{f''}\text{SiO}_{(4-f'')/2}$$

wherein each $R^5$ and its provisos are defined above, and wherein f'' is selected such that $0.5 \leq f'' \leq 1.7$.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). Typically, the resinous organopolysiloxane comprises T and/or Q units. A specific example of the resinous organopolysiloxane is a vinyl-terminated silsesquioxane.

The organopolysiloxane may comprise a combination or mixture of different organopolysiloxanes, including those of different structures. In certain embodiments, component A) comprises one or more linear organopolysiloxanes as a majority component.

As described above, in certain embodiments component A') may also be included. Examples of suitable organopolysiloxanes A') having silicon-bonded hydroxy groups are as described above with component A) but where silicon-bonded ethylenically unsaturated groups are replaced with silicon-bonded hydroxy groups.

Component B) includes at least two silicon-bonded hydrogen atoms per molecule. In various embodiments, component B) has at least three silicon-bonded hydrogen atoms per molecule. Component B) can be linear, branched, cyclic, resinous, or have a combination of such structures. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

In certain embodiments, component B) is of formula $R^8_{4-s}\text{SiH}_S$, where $R^8$ is independently selected and may be any silicon-bonded group, and s is selected such that $1 \leq s \leq 4$. Typically, s is 1, 2, or 3, alternatively 1 or 2. Each $R^8$ is typically independently a substituted or unsubstituted hydrocarbyl group. However, $R^8$ can be any silicon-bonded group so long as component B) is still capable of undergoing hydrosilylation via its silicon-bonded hydrogen atoms. For example, $R^8$ can be a halogen. When component B) is a silane compound, component B) can be a monosilane, disilane, trisilane, or polysilane.

In these or other embodiments, component B) may be an organosilicon compound of formula: $H_g R^9_{3-g'}\text{Si}-R^{10}-\text{SiR}^9_2 H$, wherein each $R^9$ is an independently selected substituted or unsubstituted hydrocarbyl group, g' is 0 or 1, and $R^{10}$ is a divalent linking group. $R^{10}$ may be a siloxane chain (including, for example, $-R^9_2\text{SiO}-$, $-R^9\text{HSiO}-$, and/or $-H_2\text{SiO}-D$ siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

In these or other embodiments, component B) comprises an organohydrogensiloxane, which can be a disiloxane, trisiloxane, or polysiloxane. Examples of organohydrogensiloxanes suitable for use as component B) include, but are not limited to, siloxanes having the following formulae: $\text{PhSi}(\text{OSiMe}_2\text{H})_3$, $\text{Si}(\text{OSiMe}_2\text{H})_4$, $\text{MeSi}(\text{OSiMe}_2\text{H})_3$, and $\text{Ph}_2\text{Si}(\text{OSiMe}_2\text{H})_2$, wherein Me is methyl, and Ph is phenyl. Additional examples of organohydrogensiloxanes that are suitable for purposes of component B) include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), and a dimethylhydrogensiloxy-terminated poly(methylhydrogensiloxane).

When component B) comprises an organohydrogensiloxane, component B) may comprise any combination of M, D, T and/or Q siloxy units, so long as component B) includes at least two silicon-bonded hydrogen atoms. These siloxy units can be combined in various manners to form cyclic, linear, branched and/or resinous (three-dimensional networked) structures. Component B) may be monomeric, polymeric, oligomeric, linear, branched, cyclic, and/or resinous depending on the selection of M, D, T, and/or Q units.

Because component B) includes at least two silicon-bonded hydrogen atoms, with reference to the siloxy units set forth above, component B) may comprise any of the following siloxy units including silicon-bonded hydrogen atoms, optionally in combination with siloxy units which do not include any silicon-bonded hydrogen atoms: $(R^9{}_2HSiO_{1/2})$, $(R^9H_2SiO_{1/2})$, $(H_3SiO_{1/2})$, $(R^9HSiO_{2/2})$, $(H_2SiO_{2/2})$, and/or $(HSiO_{3/2})$, where $R^9$ is independently selected and defined above.

In specific embodiments, for example when component B) is linear, component B) may have the average formula:

$(R^{11}{}_3SiO_{1/2})_{e''}(R^9{}_2SiO_{2/2})_{f'''}(R^9HSiO_{2/2})_{g''}$, wherein each $R_{11}$ is independently hydrogen or $R_9$, each $R_9$ is independently selected and defined above, and $e''\geq 2$, $f'''\geq 0$, and $g''\geq 2$. In specific embodiments, $e''$ is from 2 to 10, alternatively from 2 to 8, alternatively from 2 to 6. In these or other embodiments, $f'''$ is from 0 to 1,000, alternatively from 1 to 500, alternatively from 1 to 200. In these or other embodiments, $g''$ is from 2 to 500, alternatively from 2 to 200, alternatively from 2 to 100.

In one embodiment, component B) is linear and includes two or more pendent silicon-bonded hydrogen atoms. In these embodiments, component B) may be a dimethyl, methyl-hydrogen polysiloxane having the average formula:

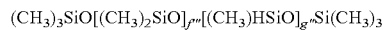
$(CH_3)_3SiO[(CH_3)_2SiO]_{f'''}[(CH_3)HSiO]_{g''}Si(CH_3)_3$ where $f'''$ and $g''$ are defined above.

In these or other embodiments, component B) is linear and includes terminal silicon-bonded hydrogen atoms. In these embodiments, component B) may be an SiH terminal dimethyl polysiloxane having the average formula:

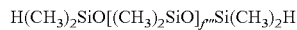
$H(CH_3)_2SiO[(CH_3)_2SiO]_{f'''}Si(CH_3)_2H$ where $f'''$ is as defined above. The SiH terminal dimethyl polysiloxane may be utilized alone or in combination with the dimethyl, methyl-hydrogen polysiloxane disclosed immediately above. Further, the SiH terminal dimethyl polysiloxane may have one trimethylsiloxy terminal such that the SiH terminal dimethyl polysiloxane may have only one silicon-bonded hydrogen atom. Alternatively still, component B) may include both pendent and terminal silicon-bonded hydrogen atoms.

In these embodiments, at a temperature of 25° C., the substantially linear organohydrogenpolysiloxane is typically a flowable liquid or is in the form of an uncured rubber. Generally, the substantially linear organohydrogenpolysiloxane has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In certain embodiments, component B) may have one of the following average formulas:

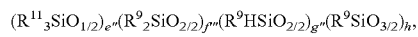
$(R^{11}{}_3SiO_{1/2})_{e''}(R^9{}_2SiO_{2/2})_{f'''}(R^9HSiO_{2/2})_{g''}(R^9SiO_{3/2})_h$,

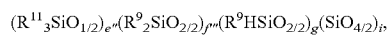
$(R^{11}{}_3SiO_{1/2})_{e''}(R^9{}_2SiO_{2/2})_{f'''}(R^9HSiO_{2/2})_{g''}(SiO_{4/2})_i$,

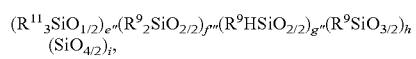
$(R^{11}{}_3SiO_{1/2})_{e''}(R^9{}_2SiO_{2/2})_{f'''}(R^9HSiO_{2/2})_{g''}(R^9SiO_{3/2})_h(SiO_{4/2})_i$, wherein each $R^{11}$ and $R^9$ is independently selected and defined above, $e''$, $f'''$, and $g''$ are defined above, and $h\geq 0$, and $i$ is $\geq 0$.

Some of the average formulas above for component B) are resinous when component B) includes T siloxy units (indicated by subscript h) and/or Q siloxy units (indicated by subscript i). When component B) is resinous, component B) is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, or an MDQ resin.

In various embodiments in which component B) is resinous, or comprises an organopolysiloxane resin, component B) typically has the formula:

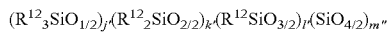
$(R^{12}{}_3SiO_{1/2})_{j'}(R^{12}{}_2SiO_{2/2})_{k'}(R^{12}SiO_{3/2})_{l'}(SiO_{4/2})_{m''}$ wherein each $R^{12}$ independently is H or a substituted or unsubstituted hydrocarbyl group, with the proviso that in one molecule, at least one $R^{12}$ is H; and wherein $0\leq j'\leq 1$; $0\leq k'\leq 1$; $0\leq l'\leq 1$; and $0\leq m''\leq 1$; with the proviso that $j'+k'+l'+m''=1$.

In certain embodiments, component B) may comprise an alkylhydrogen cyclosiloxane or an alkylhydrogen dialkyl cyclosiloxane copolymer, represented in general by the formula $(R^{12}{}_2SiO)_{r'}(R^{12}HSiO)_{s'}$, where $R^{12}$ is independently selected and defined above, and where r' is an integer from 0-7 and s' is an integer from 3-10. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl ($—CH_3$). Component B) can be a single silicon hydride compound or a combination comprising two or more different silicon hydride compounds.

The composition may comprise components A) and B) in varying amounts or ratios contingent on desired properties of the composition and foams formed therefrom. In various embodiments, the composition comprises components A) and B) in an amount to provide a mole ratio of silicon-bonded hydrogen atoms to aliphatically unsaturated groups of from 0.3 to 5, alternatively from 0.6 to 3.

Hydrosilylation catalyst C) includes at least one hydrosilylation catalyst that promotes the reaction between the organopolysiloxane A) and the organosilicon compound B). The hydrosilylation catalyst C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for C) include the complexes of chloroplatinic acid and certain vinyl-containing organosiloxanes disclosed by Willing in U.S. Pat. No. 3,419,593. A catalyst of this type is the reaction product of chloroplatinic acid and 1,3-diethenyl-1,1,3,3-tetramethyldisiloxane.

The hydrosilylation catalyst C) can also be a supported hydrosilylation catalyst comprising a solid support having a platinum group metal on the surface thereof. A supported catalyst can be conveniently separated from organopolysiloxanes, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The catalyst can be platinum metal, platinum metal deposited on a carrier, such as silica gel or powdered charcoal, or a compound or complex of a platinum group metal. Typical catalysts include chloroplatinic acid, either in hexahydrate form or anhydrous form, and/or a platinum-containing catalyst which is obtained by a method comprising reacting chloroplatinic acid with an aliphatically unsaturated organosilicon compound, such as divinyltetramethyldisiloxane, or alkene-platinum-silyl complexes as described in U.S. Pat. No. 6,605,734. An example is: (COD)Pt(SiMeCl$_2$)$_2$ where "COD" is 1,5-cyclooctadiene. These alkene-platinum-silyl complexes may be prepared, e.g. by mixing 0.015 mole (COD)PtCl$_2$ with 0.045 mole COD and 0.0612 moles HMeSiCl$_2$.

One suitable platinum catalyst type is Karstedt's catalyst, which is described in Karstedt's U.S. Pat. Nos. 3,715,334 and 3,814,730. Karstedt's catalyst is a platinum divinyl tetramethyl disiloxane complex typically containing about 1 wt. % of platinum in a solvent, such as toluene. Another suitable platinum catalyst type is a reaction product of chloroplatinic acid and an organosilicon compound containing terminal aliphatic unsaturation (described in U.S. Pat. No. 3,419,593).

In addition or alternatively, the hydrosilylation catalyst C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst C) can be a single catalyst or a mixture comprising two or more different catalysts that differ in at least one property, such as structure, form, platinum group metal, complexing ligand, and thermoplastic resin.

The catalyst is present in the composition in a catalytic amount, i.e., an amount or quantity sufficient to promote a reaction or curing thereof at desired conditions. Varying levels of the catalyst can be used to tailor reaction rate and cure kinetics. The catalytic amount of the catalyst may be greater than 0.01 ppm, and may be greater than 1,000 ppm (e.g., up to 10,000 ppm or more). In certain embodiments, the catalytic amount of catalyst is less than 5,000 ppm, alternatively less than 2,000 ppm, and alternatively less than 1,000 ppm (but in any case greater than 0 ppm). In specific embodiments, the catalytic amount of the catalyst may range from 0.01 to 1,000 ppm, alternatively 0.01 to 100 ppm, and alternatively 0.01 to 50 ppm, of metal based on the weight of the composition. The ranges may relate solely to the metal content within the catalyst or to the catalyst altogether (including its ligands). In certain embodiments, these ranges relate solely to the metal content within the catalyst.

Condensation-Curable Compositions

In certain embodiments, the silicone composition comprises or is a condensation-curable silicone composition. In these embodiments, the condensation-curable silicone composition comprises or consists essentially of: (A') an organopolysiloxane having an average of at least two silicon-bonded hydroxyl or hydrolysable groups per molecule; (B') an organosilicon compound having an average of at least two silicon-bonded hydrogen atoms, hydroxy groups, or hydrolysable groups per molecule; and (C') a condensation catalyst. Although any parameter or condition may be selectively controlled during the inventive method or any individual step thereof, relative humidity and/or moisture content of ambient conditions may be selectively controlled to further impact a cure rate of condensation-curable silicone compositions. In various embodiments, the hydroxy groups described herein are further defined as hydroxyl groups.

In certain embodiments, the organopolysiloxane (A') has an average of at least two silicon-bonded hydroxy groups per molecule and the organosilicon compound (B') has an average of at least two silicon-bonded hydrogen atoms per molecule. Reaction between such components generally generates hydrogen gas, which serves as a blowing agent for the foam.

Examples of suitable organopolysiloxanes (A') having silicon-bonded hydroxy groups are as described above with component A) but where silicon-bonded ethylenically unsaturated groups are replaced with silicon-bonded hydroxyl or hydrolysable groups. Examples of suitable organosilicon compounds (B') having silicon-bonded hydrogen atoms are as described above with component B).

The organopolysiloxane (A') and the organosilicon compound (B') may independently be linear, branched, cyclic, or resinous. In particular, the organopolysiloxane (A') and the organosilicon compound (B') may comprise any combination of M, D, T, and Q units, as with the organopolysiloxane (A) and the organosilicon compound (B) described above.

In certain embodiments, one of the organopolysiloxane (A') and the organosilicon compound (B') comprises a silicone resin, which typically comprises T and/or Q units in combination with M and/or D units. When the organopolysiloxane (A') and/or organosilicon compound (B') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the condensation-curable silicone composition comprises a resin, the resulting insulating layer 38 will have increased rigidity.

Alternatively, in other embodiments, the organopolysiloxane (A') and/or the organosilicon compound (B') is an organopolysiloxane comprising repeating D units. Such organopolysiloxanes are substantially linear but may include some branching attributable to T and/or Q units. Alternatively, such organopolysiloxanes are linear. In these embodiments, the resulting insulating layer 38 is elastomeric.

The silicon-bonded hydroxy groups and silicon-bonded hydrogen atoms, hydroxy groups, or hydrolysable groups of the organopolysiloxane (A') and the organosilicon compound (B'), respectively, may independently be pendent, terminal, or in both positions.

As known in the art, silicon-bonded hydroxy groups result from hydrolyzing silicon-bonded hydrolysable groups. These silicon-bonded hydroxy groups may condense to form siloxane bonds with water as a byproduct.

Examples of hydrolysable groups include the following silicon-bonded groups: H, a halide group, an alkoxy group, an alkylamino group, a carboxy group, an alkyliminoxy group, an alkenyloxy group, or an N-alkylamido group. Alkylamino groups may be cyclic amino groups.

In a specific embodiment, the organopolysiloxane (A') has the general formula:

$$(R^1R^3{}_2SiO_{1/2})_{w'}(R^3{}_2SiO_{2/2})_{x'}(R^3SiO_{3/2})_{y'}(SiO_{4/2})_{z'} \quad \quad (II)$$

wherein each $R^1$ is defined above and each $R^3$ is independently selected from $R^1$ and a hydroxy group, a hydrolysable group, or combinations thereof with the proviso that at least two of $R^3$ are hydroxy groups, hydrolysable groups, or combinations thereof, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x' typically has a value of from 0 to 0.9, alternatively from 0 to 0.45, alternatively from 0 to 0.25. The subscript y' typically has a value of from 0 to 0.99, alternatively from 0.25 to 0.8, alternatively from 0.5 to 0.8. The subscript z' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The organosilicon compound (B') may be linear, branched, cyclic, or resinous. In one embodiment, the organosilicon compound (B') has the formula $R^1_q SiX_{4-q}$, wherein $R^1$ is defined above, X is a hydrolysable group, and q is 0 or 1.

Specific examples of organosilicon compounds (B') include alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CF_3CH_2CH_2Si(OCH_2CH_2OCH_3)_3$, $CH_2=CHCH_2Si(OCH_2CH_2OCH_3)_3$, $CH_3Si(OCH_2CH_2OCH_3)_3$, $CH_2=CHSi(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O-N=C(CH_3)CH_2CH_3]_3$, $Si[O-N=C(CH_3)CH_2CH_3]_4$, and $CH_2=CHSi[O-N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]$ and $CH_3Si(NHC_6H_{11})_3$; and organoaminooxysilanes.

The organosilicon compound (B') can be a single silane or a mixture of two or more different silanes, each as described above. Also, methods of preparing tri- and tetra-functional silanes are well known in the art; many of these silanes are commercially available.

The concentration of the organosilicon compound (B') in the condensation-curable silicone composition is sufficient to cure (cross-link) the organopolysiloxane (A'). The particular amount of the organosilicon compound (B') utilized depends on the desired extent of cure, which generally increases as the ratio of the number of moles of silicon-bonded hydrolysable groups in the organosilicon compound (B') to the number of moles of silicon-bonded hydroxy groups in the organopolysiloxane (A') increases. The optimum amount of the organosilicon compound (B') can be readily determined by routine experimentation. It is to be appreciated that in some embodiments, the organopolysiloxane (A') and the organosilicon compound (B') can be different molecules, but otherwise can be the same formula/chemistry.

If utilized, the condensation catalyst (C') can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst (C') can be selected from tin(II) and tin(IV) compounds such as tin dilaurate, tin dioctoate, and tetrabutyl tin; and titanium compounds such as titanium tetrabutoxide.

When present, the concentration of the condensation catalyst (C') is typically from 0.1 to 10% (w/w), alternatively from 0.5 to 5% (w/w), alternatively from 1 to 3% (w/w), based on the total weight of the organopolysiloxane (A') in the condensation-curable silicone composition.

When the condensation-curable silicone composition includes the condensation catalyst (C'), the condensation-curable silicone composition is typically a two-part composition where the organopolysiloxane (A') and condensation catalyst (C') are in separate parts. In this embodiment, the organosilicon compound (B') is typically present along with the condensation catalyst (C'). Alternatively still, the condensation-curable silicone composition may be a three-part composition, where the organopolysiloxane (A'), the organosilicon compound (B') and condensation catalyst (C') are in separate parts.

Curing conditions for such condensation-curable silicone compositions may vary. For example, condensation-curable silicone composition may be solidified or cured upon exposure to ambient conditions and/or heat, although heat is commonly utilized to accelerate solidification and curing. In various embodiments, insulating layer 38 is formed at ambient or room temperature conditions.

Optional Additive(s)

The composition may optionally further comprise additional ingredients or components (or "additives"), especially if the ingredient or component does not prevent the composition from curing and/or foaming. Examples of additional ingredients include, but are not limited to, surfactants; carrier vehicles or solvents; stabilizers; adhesion promoters; colorants, including dyes and pigments; anti-oxidants; heat stabilizers; flame retardants; thixotropic agents; flow control additives; inhibitors; fillers, including extending and reinforcing fillers; and cross-linking agents. These and other suitable additives are described in U.S. Pat. No. 4,026,845, WO2014099132, WO2018024858, WO2018024859, and WO2018063849. Further examples of components suitable for the first composition are described in WO2014008322.

One or more of the additives can be present as any suitable weight percent (wt. %) of the composition, such as about 0.01 wt. % to about 65 wt. %, about 0.05 wt. % to about 35 wt. %, about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition. One of skill in the art can readily determine a suitable amount of additive depending, for example, on the type of additive and the desired outcome. Certain optional additives are described in greater detail below.

Suitable carrier vehicles (or diluents) include silicones, both linear and cyclic, organic oils, organic solvents and mixtures of these. Specific examples of solvents may be found in U.S. Pat. No. 6,200,581.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm²/sec, such as hexamethylcyclotrisiloxane, octamethylcyclotetrasiloxane, ecamethylcyclopentasiloxane, dodecamethylcyclohexasiloxane, octamethyltrisiloxane, decamethyltetrasiloxane, dodecamethylpentasiloxane, tetradecamethylhexasiloxane, exadeamethylheptasiloxane, heptamethyl-3-{(trimethylsilyl)o- xy)}trisiloxane, hexamethyl-3,3, bis{(trimethylsilyl)oxy} trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Suitable surfactants (or "foaming aids") include silicone polyethers, ethylene oxide polymers, propylene oxide polymers, copolymers of ethylene oxide and propylene oxide, other non-ionic surfactants, and combinations thereof. Further suitable surfactants may comprise a nonionic surfactant, a cationic surfactant, an anionic surfactant, an amphoteric surfactant, or a mixture of such surfactants.

In various embodiments, the composition comprises a fluorocarbon surfactant or fluorinated surfactant. The fluorinated surfactants can be any of those compounds known in the art which contain fluorine atoms on carbon and are also surfactants. These fluorinated surfactants can be organic or silicon containing. Silicon-containing fluorinated surfactants can be siloxanes, for example, which contain organic radicals having fluorine bonded thereto. In various embodiments, adding the fluorinated surfactant to the composition decreases the cured foam density. In general, increasing the amount of fluorinated surfactant in the composition decreases the density of the foam. It is thought that this is especially true for slow cure systems, where the surfactant stabilizes bubbles while the network forms and cures.

In various embodiments, the composition further comprises an organopolysiloxane resin ("resin"). Suitable resins are as described above. In certain embodiments, the resin is an MQ resin. The resin can be useful for stabilizing the foam.

Suitable pigments are understood in the art. In various embodiments, the composition further comprises carbon black, e.g. acetylene black.

The composition may include one or more fillers. The fillers may be one or more reinforcing fillers, non-reinforcing fillers, or mixtures thereof. Examples of finely divided, reinforcing fillers include high surface area fumed and precipitated silicas including rice hull ash and to a degree calcium carbonate. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, the composition includes at least one filler comprising hollow particles, e.g. hollow spheres. Such fillers can be useful for contributing to porosity and/or overall void fraction of the foam. In certain embodiments, some fillers can be utilized to tune the thixotropic property of the composition.

The filler if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyi disilazane or short chain siloxane diols. Generally the surface treatment renders the filler(s) hydrophobic and therefore easier to handle and obtain a homogeneous mixture with the other components in the composition. Silanes such as $R^5_e Si(OR^6)_{4-e}$ where $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^6$ is an alkyl group of 1 to 6 carbon atoms, and subscript "e" is equal to 1, 2 or 3, may also be utilized as the treating agent for fillers.

In various embodiments, the composition further comprises a reaction inhibitor. For example, an alkyne alcohol such as 2-methyl-3-butyn-2-ol, 3,5-dimethyl-1-hexyn-3-ol, or 2-phenyl-3-butyn-2-ol; an ene-yne compound such as 3-methyl-3-penten-1-yne or 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole may be incorporated as an optional component in the composition.

The content of the reaction inhibitor in the composition is not particularly limited. In certain embodiments, the content of the reaction inhibitor is from about 0.0001 to about 5 parts by mass per 100 parts total mass of components A), B), and C). One of skill in the art can readily determine the amount of a particular type of reaction inhibitor (or inhibitors) to make catalysis more latent.

In various embodiments, the composition further comprises a thixotropic agent. Suitable thixotropic agents include rheological agents, specific examples of such agents may be found in U.S. Pub. Nos. 2018/0066115 A1 and 2018/0208797 A1.

In various embodiments, the composition further comprises an adhesion-imparting agent. The adhesion-imparting agent can improve adhesion of the foam to a base material being contacted during curing, e.g. the second surface 36. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl) ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom.

This organosilicon compound generally has a silicon-bonded alkenyl group or silicon-bonded hydrogen atom. Moreover, due to the ability to impart good adhesion with respect to various types of base materials, this organosilicon compound generally has at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by γ silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxy group and at least one silicon-bonded alkenyl group in the molecule; and methyl polysilicate, ethyl polysilicate, and epoxy group-containing ethyl polysilicate.

The content of the adhesion-imparting agent in the composition is not particularly limited. In certain embodiments, the content of the adhesion-imparting agent is from about 0.01 to about 10 parts by mass per 100 parts total mass of components (A/A') and (B/B').

Blowing Agent(s)

In various embodiments, the composition includes at least one blowing agent. In instances where a blowing agent is already present or generated during reaction, e.g. hydrogen gas, the blowing agent may be referred to as a supplemental blowing agent, although the supplemental blowing agent may provide a majority of the foaming. If utilized, the blowing agent can be selected from the group of chemical blowing agents, physical blowing agents, and combinations thereof. Examples of such blowing agents are described below.

The amount of blowing agent utilized can vary depending on the desired outcome. For example, the amount of blowing agent can be varied to tailor final foam density and foam rise profile.

Chemical Blowing Agents

In various embodiments, the composition includes a chemical blowing agent. In certain embodiments, the chemical blowing agent has at least one OH group, alternatively at least two OH groups, and alternatively three or more OH groups. In certain embodiments, the chemical blowing agent has one or two OH group(s), and alternatively one OH group. The OH group(s) can react with the Si—H groups of component B)/(B'), thereby generating hydrogen gas, which is useful for reducing density of the foam.

In various embodiments, the chemical blowing agent is selected from the group of low molecular weight alcohols. Examples of low molecular weight alcohols include, but are not limited to, methanol, ethanol, propanol, isopropanol, and the like. These and other suitable alcohols can be selected from the group of organic alcohols having from 1 to 12 carbon atoms.

In various embodiments, the chemical blowing agent is a diol. Examples of suitable diols include, but are not limited to, methylene glycol, ethylene glycol, diethylene glycol, propylene glycol, dipropylene glycol, butane diol, bisphenol A, 1,4-butanediol, 1,3-propanediol, 1,5-pentanediol, 1,7-heptanediol, 1,2-hexanediol, triethylene glycol, tripropylene glycol neopentyl glycol, and combinations thereof. In certain embodiments, the diol has the following general formula: HO—$R^7$—OH. In these embodiments, $R^7$ is selected from alkyl, cycloalkyl, alkyl cycloalkyl, aromatic, and alkylaromatic diradicals. Such diradicals generally have up to 50, up to 40, up to 30, up to 20, or up to 10, carbon atoms, or any number of carbon atoms between 1 and 50. The carbon chain which makes up the backbone of the diol may be straight chained or branched. In certain embodiments, the diol may have ether, thio, or amine linkages in its main chain. In specific embodiments, R' is a hydrocarbylene group having from 1 to 10, 2 to 9, 3 to 8, 4 to 7, 5, or 6, carbon atom(s). In other embodiments, the chemical blowing agent is a triol.

In various embodiments, the chemical blowing agent is selected from the group of low-boiling alcohols. Such alcohols generally have a boiling point lower than about 120° C. The alcohols may or may not be anhydrous. Other suitable blowing agents are described in U.S. Pat. Nos. 4,550,125, 6,476,080, and US20140024731.

In other embodiments, the chemical blowing agent is selected from the group of Si—OH polymers. In certain embodiments, the chemical blowing agent is selected from the group consisting of organosilanes and organosiloxanes having at least one silanol (Si—OH) group. Such compounds can have structures similar to or the same as those described above for component A'). Examples of suitable OH-functional compounds include dialkyl siloxanes, such as OH-terminated dimethyl siloxanes. Such siloxanes may have a relatively low viscosity, such as about 10 to about 5,000, about 10 to about 2,500, about 10 to about 1,000, about 10 to about 500, or about 10 to about 100, mPa·s.

Physical Blowing Agents

In various embodiments, the composition includes a physical blowing agent. The physical blowing agent may be used in addition or alternate to the chemical blowing agent.

In various embodiments, the physical blowing agent is one that undergoes a phase change from a liquid to a gaseous state during exposure to atmospheric pressure and a temperature≥10° C., alternatively≥20° C., alternatively≥30° C., alternatively≥40° C., alternatively≥50° C., alternatively≥60° C., alternatively≥70° C., alternatively≥80° C., alternatively≥90° C., alternatively≥100° C. The boiling point temperature generally depends upon the particular type of physical blowing agent.

Useful physical blowing agents include hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons ("HCFCs"), ethers, ketones and esters, for example methyl formate, ethyl formate, methyl acetate or ethyl acetate, in liquid form or air, nitrogen or carbon dioxide as gases. In specific embodiments, the physical blowing agent comprises or is pentane. In certain embodiments, the physical blowing agent comprises a compound selected from the group consisting of propane, butane, isobutane, isobutene, isopentane, dimethylether or mixtures thereof. In many embodiments, the blowing agent comprises a compound that is inert. These and other suitable physical blowing agents are described in U.S. Pat. Nos. 5,283,003A, 6,476,080B2, 6,599,946B2, EP3135304A1, and WO2018095760A1.

In various embodiments, the physical blowing agent comprises a hydrofluorocarbon ("HFC"). "Hydrofluorocarbon" and "HFC" are interchangeable terms and refer to an organic compound containing hydrogen, carbon, and fluorine. The compound is substantially free of halogens other than fluorine.

Examples of suitable HFCs include aliphatic compounds such as 1,1,1,3,3-pentafluoropropane (HFC-245fa), 1,1,1,3,3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane; as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluro-3-(trifluoromethyl)benzene. In certain embodiments, HFC-365mfc and HFC-245fa may be preferred due to their increasing availability and ease of use, with HFC-365mfc having a higher boiling point than HFC-245fa which may be useful in certain applications. For example, HFCs having a boiling point higher than 30° C., such as HFC-365mfc, may be desirable because they do not require liquefaction during foam processing.

Second Composition

In various embodiments, at a temperature of 25° C., the second composition is typically a flowable liquid prior to reaction to form the backing layer 40. Generally, the second composition has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art. If viscosity is too high, the second composition may be difficult to handle or apply.

In various embodiments, the backing layer 40 comprises the reaction product of: an isocyanate component; and an isocyanate-reactive component. These components and other optional components are described below. In certain embodiments, the backing layer 40 comprises a foamed PUR, a foamed PIR, or a foamed combination of PUR and PIR.

Specific examples of suitable PUR/PIR foams, systems, compositions, formulations, and components thereof are commercially available from: The 3M Company under the trade name 3M™, such as 3M™ Fire Barrier Rated Foam, FIP 1-Step; BASF Corporation under the trade names ELASTOPOR®, ELASTOCOOL®, ELASTOCOOL PLUS®, ELASTOFOAM®, ELASTOPIR™, ELASTOPORT, ELASTROSPRAY®, LUPRANATE®, and PLURACOL®, such as LUPRANATE® pMDI, MDI, and isocyanate-prepolymers, e.g., LUPRANATE® M20 Isocyanate, LUPRANATE® M20S Isocyanate, LUPRANATE® M70L Isocyanate, LUPRANATE® M70R Isocyanate, LUPRANATE® MP102 Isocyanate, and LUPRANATE® M20S Isocyanate, and PLURACOL® polyols, e.g., PLURACOL® P-945, PLURACOL® 1421, PLURACOL® GP430, PLURACOL® CASE Polyols, PLURACOL® Rigid Polyols etc.; and The Dow Chemical Company under the trade names VORATHERM™ AND VORANATE™, such as VORATHERM™ CN 815 Polyol, VORATHERM™ CN 626 Catalyst and VORANATE™ M 647 SH Isocyanate.

As understood in the art, polyurethane (PUR or PU) is a polymer composed of organic units joined by carbamate (urethane) links. Polyurethane polymers are generally formed by reacting a di- or tri poly-isocyanate with a polyol. Since polyurethanes contain two types of monomers, which polymerize one after the other, they are generally classed as alternating copolymers. Both the isocyanates and polyols used to make polyurethanes contain, on average, two or more functional groups per molecule.

On the other hand, polyisocyanurate, also referred to as PIR, polyiso, or ISO, is a thermoset plastic typically produced as a foam and used as rigid thermal insulation. The starting materials are similar to those used in PUR except that oftentimes, a proportion of methylene diphenyl diisocyanate ("MDI") is higher and a polyester-derived polyol is used in the reaction instead of a polyether polyol. The resulting chemical structure is significantly different, with the isocyanate groups on the MDI trimerising to form isocyanurate groups which the polyols link together, giving a complex polymeric structure.

Isocyanate Component

Examples of suitable isocyanate components for forming the second composition include organic polyisocyanates, which may have two or more isocyanate functionalities, and include conventional aliphatic, cycloaliphatic, araliphatic and aromatic isocyanates. The isocyanate component may be selected from the group of diphenylmethane diisocyanates ("MDI"), polymeric diphenylmethane diisocyanates ("pMDI"), toluene diisocyanates ("TDI"), hexamethylene diisocyanates ("HDI"), dicyclohexylmethane diisocyanates ("HMDI"), isophorone diisocyanates ("IPDI"), cyclohexyl diisocyanates ("CHDI"), and combinations thereof. In certain embodiments, the isocyanate component comprises or is a pMDI. In one embodiment, the isocyanate component is of the formula OCN—R—NCO, wherein R is selected from one of an alkyl moiety, an aryl moiety, and an arylalkyl moiety. In this embodiment, the isocyanate component can include any number of carbon atoms, typically from 4 to 20 carbon atoms.

Specific examples of suitable isocyanate components include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane, 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates, as well as mixtures of MDI and toluene diisocyanates.

The isocyanate component may include modified multivalent isocyanates, i.e., products obtained by the partial chemical reaction of organic diisocyanates and/or polyisocyanates. Examples of suitable modified multivalent isocyanates include diisocyanates and/or polyisocyanates containing ester groups, urea groups, biuret groups, allophanate groups, carbodiimide groups, isocyanurate groups, and/or urethane groups. Specific examples of suitable modified multivalent isocyanates include organic polyisocyanates containing urethane groups and having an NCO content of 15 to 33.6 parts by weight based on the total weight, e.g. with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of from 3.5 to 29 parts by weight based on the total weight of the isocyanate and produced from the polyester polyols and/or polyether polyols; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups having an NCO content of from 15 to 33.6 parts by weight based on the total weight of the isocyanate component, may also be suitable, e.g. based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

It is to be appreciated that the isocyanate component may include any combination of two or more of the aforementioned isocyanates.

Isocyanate-Reactive Component

In various embodiments, isocyanate-reactive component is a polyol. The polyol is typically chosen from conventional polyols, such as ethylene glycol, diethylene glycol, propylene glycol, dipropylene glycol, butane diol, glycerol, trimethylolpropane, triethanolamine, pentaerythritol, sorbitol, and combinations thereof. Other suitable polyols include, but are not limited to, biopolyols, such as soybean oil, castor-oil, soy-protein, rapeseed oil, etc., and combinations thereof.

Suitable polyether polyols include, but are not limited to, products obtained by the polymerization of a cyclic oxide, for example ethylene oxide ("EO"), propylene oxide ("PO"), butylene oxide ("BO"), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used. In certain embodiments, the polyol comprises a mixture of polyester and polyether polyols.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In certain embodiments, the polyol is a polymer polyol. In certain embodiments, the polymer polyol is a graft polyol. Graft polyols may also be referred to as graft dispersion polyols or graft polymer polyols. Graft polyols often include products, i.e., polymeric particles, obtained by the in-situ polymerization of one or more vinyl monomers, e.g. styrene monomers and/or acrylonitrile monomers, and a macromer in a polyol, e.g. a polyether polyol.

In other embodiments, the polymer polyol is chosen from polyharnstoff (PHD) polyols, polyisocyanate polyaddition (PIPA) polyols, and combinations thereof. It is to be appreciated that the isocyanate-reactive component can include any combination of the aforementioned polymer polyols. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanolamine instead of a diamine, to give a polyurethane dispersion in a polyol. The second composition is not limited to any particular method of making the polymer polyol, if utilized.

It is to be appreciated that the isocyanate-reactive component may include any combination of two or more of the aforementioned polyols.

Optional Additive(s)

The second composition may further include an additive component. The additive component may be as descried above for the first composition and/or may be selected from the group of catalysts, blowing agents, plasticizers, cross-linking agents, chain-extending agents, chain-terminating agents, wetting agents, surface modifiers, waxes, foam stabilizing agents, moisture scavengers, desiccants, viscosity reducers, cell-size reducing compounds, reinforcing agents, dyes, pigments, colorants, mold release agents, anti-oxidants, compatibility agents, ultraviolet light stabilizers, thixotropic agents, anti-aging agents, lubricants, coupling agents, solvents, rheology promoters, adhesion promoters, thickeners, fire retardants, smoke suppressants, anti-static agents, anti-microbial agents, and combinations thereof.

In certain embodiments, the additive component comprises a catalyst component. In one embodiment, the catalyst component comprises a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, PA, under the trademark DABCO®. The organometallic catalyst can also comprise other dialkyltin(IV)

salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines including tris(N,N-dimethylaminopropyl)-shexahydrotriazine; tetraalkylammonium hydroxides including tetramet hylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, N,N,N-trimethyl isopropyl amine/formate, and combinations thereof.

Yet further examples of other suitable catalysts, specifically tertiary amine catalysts, include dimethylaminoethanol, dimethylaminoethoxyethanol, triethylamine, N,N,N', N'-tetramethylethylenediamine, N,N-dimethylaminopropylamine, pentamethyldipropylenetriamine, tris(dimethylaminopropyl)amine, N,N-dimethylpiperazine, tetramethylimino-bis(propylamine), dimethylbenzylamine, trimethylamine, triethanolamine, N, N-diethyl ethanolamine, N-methylpyrrolidone, N-methylmorpholine, N-ethylmorpholine, bis(2-dimethylamino-ethyl)ether, N,N-dimethylcyclohexylamine ("DMCHA"), N,N,N',N',N''-pentamethyldiethylenetriamine, 1,2-dimethylimidazole, 3-(dimethylamino) propylimidazole, and combinations thereof.

The catalyst component can be utilized in various amounts. The catalyst component may include any combination of the aforementioned catalysts.

In various embodiments, the second composition includes a blowing agent. In instances where a blowing agent is already present or generated during reaction, the blowing agent may be referred to as a supplemental blowing agent, although the supplemental blowing agent may provide a majority of the foaming. If utilized, the blowing agent can be selected from the group of chemical blowing agents, physical blowing agents, and combinations thereof. Examples of suitable bowing agents are as described above for the first composition and further examples are understood in the art. For example, the blowing agent may comprises water. Further examples of additives and/or other components suitable for the second composition are described in U.S. Pat. No. 8,101,702B2, U.S. Pat. No. 9,097,011B1, U.S. Pat. No. 9,920,202B2, and US20180049618A1.

INDUSTRIAL APPLICABILITY

The article 20 of this disclosure is useful as a replacement for conventional glass wool or rock wool used as insulating material for appliances, such as ranges, stoves, water heaters, boilers, etc. The article 20 provides considerable improvement of productivity, similar to better insulation properties, and handling of a more friendly material. Appliances need insulation material to keep temperature inside with consequent savings in time and energy. The article 20 of this disclosure eliminates problems related to use and handling of glass and rock wools by using more friendly materials, as well as the use of automatic processing in silicone and PUR/PIR technology, such as robotic sprayers. The article 20 of this disclosure can also improve thermal efficiency thus providing better energy rated appliances. Other advantages are described above.

In various embodiments, the article 20 of this disclosure can manage a peak oven temperature of 500° C., optionally a peak temperature of 300° C., or optionally a peak temperature of from 290 to 240° C., with the silicone foam acting as the insulating layer 38 and reducing the exposure temperature to the PUR/PIR foam as the backing layer 40 to less than 100° C. In other words, the insulating layer 38 is the first barrier to absorb the most intense heat and then the backing layer 40 completes temperature management. As understood in the art, self-clean(ing) ovens can reach temperatures well above cooking temperatures (e.g. 471° C.), whereas broiling temperatures normally range from 260 to 290° C., and cooking temperatures normally range from 100 to 250° C.

The following examples, illustrating the components of the compositions, composite articles, and methods, are intended to illustrate and not to limit the invention.

A silicone composition is formed by mixing equal parts of A and B below. The silicone composition reacts to form a foamed RTV silicone

| Part A | |
|---|---|
| Component | Weight (%) |
| Zinc Oxide | 0.68 |
| Carbon Black | 0.34 |
| Aluminum Oxide | 0.05 |
| Quartz | 17 |
| Tetramethyldivinyldisiloxane | 0.02 |
| Decamethylcyclopentasiloxane | 0.24 |
| Octamethylcyclotetrasiloxane | 0.18 |
| Dimethyl Siloxane, Dimethylvinylsiloxy-terminated | 39 |
| 1,3-Diethenyl-1,1,3,3-Tetramethyldisiloxane Complexes (Platinum) | *(ppm) |
| Dimethyl Siloxane, Hydroxy-terminated | 43 |
| Water | 0.07 |
| D6+ Dimethylcyclosiloxanes | 0.47 |

*catalytic amount

| Part B | |
|---|---|
| Component | Weight (%) |
| Aluminum Oxide | 0.05 |
| Heptane | 0.02 |
| Quartz | 16 |
| Tetramethyltetravinylcyclotetrasiloxane | 0.09 |
| Decamethylcyclopentasiloxane | 0.39 |
| Octamethylcyclotetrasiloxane | 0.35 |
| Methylhydrogen Siloxane, Trimethylsiloxy-terminated | 8.5 |
| Dimethyl Siloxane, Trimethylsiloxy-terminated | 0.02 |
| Methylhydrogen Cyclosiloxanes | 0.13 |
| Dimethyl, Methylhydrogen Siloxane, Trimethylsiloxy-terminated | 2.1 |
| Dimethyl Siloxane, Dimethylvinylsiloxy-terminated | 1.9 |
| Dimethyl Siloxane, Hydroxy-terminated | 69 |
| Water | 0.07 |
| D6+ Dimethylcyclosiloxanes | 0.83 |

Different materials were analyzed as illustrated in Table I below. Examples 1 to 4 are comparative examples. Example 5 is an inventive example.

TABLE I

| Example No.: Property | Material | | | | 5 Silicone: PUR/PIR Foam Composite (6) |
|---|---|---|---|---|---|
| | 1 Glass Wool | 2 Rock Wool | 3 Silicone Foam | 4 PUR/PIR Foam | |
| Density (Kg/m³) (1) | 33 | 52 | 300 | 33 | 86 |
| Thermal Conductivity (W/(m · K)) (2) | 0.030 | 0.033 | 0.08 | 0.025 | 0.033 |
| Peak Temperature (° C.) (3) | 250 | 760 | 240 | 100 | 240 (7) |
| Automation of Material Placement (4) | Difficult | Difficult | Yes | Yes | Yes |
| Operator contact with Material (5) | Yes | Yes | No | No | No |

Notes:
(1) Density defined via sample dimensions/weight measurement. All samples are 200×200×25 mm blocks
(2) Thermal conductivity under ASTM C518—Standard Test Method for Steady-State Thermal Transmission Properties by Means of the Heat Flow Meter Apparatus
(3) Thermal gravimetric analysis ("TGA") according to ASTM E2550
(4) & (5) Based on customer calls and/or experiences
(6) Silicone:PUR/PIR (5 mm:20 mm thickness ratio—IL:BL)
(7) Considering silicone foam is the first barrier for the heat. PUR/PIR foam will work under its peak temperature.

Further examples of the composite article were also made, changing the ratio of silicone:PUR/PIR foam: 15 mm:10 mm (Example 6) and 20 mm:5 mm (Example 7) with Thermal Conduct. W/(m·K) of 0.39 and 0.04, respectively.

The silicone foam is the foamed RTV silicone described above.

The PUR/PIR foam is formed by mixing 100 parts-by-weight ("pbw") polyol, ~3 pbw catalyst, ~12.5 pbw blowing agent, and ~195 pbw isocyanate. The polyol has comprises a mixture of polyester polyol (majority) and polyether polyol, has a hydroxyl number of 234 mg KOH/g (according to ASTM D4274), and a viscosity of 1550 mPa·s at 20° C. (according to ASTM 4889). The catalyst comprises 2-ethylhexanoic acid potassium salt and dimethylcyclohexylamine ("DMCHA"), has a hydroxyl number of 259 mg KOH/g, and a viscosity of 160 mPa·s at 20° C. The blowing agent is pentane. The isocyanate comprises pMDI, has an NCO content of 30.5 (according to ASTM D5155), and a viscosity of 650 mPa·s at 20° C. The foam has a cream time of ~13 seconds and gel time of ~55 seconds (each according to SH-PM-17), and a free rise density of ~41 kg/m³ (according to SH-PM-04).

The blocks of inventive Examples 5, 6, and 7 were made as follows. The silicone composition is poured into an open-mold and it foams freely. The silicone foam is then removed and cut into slices of uniform thickness, e.g. 5, 15, and 20 mm. A silicone foam slice is then placed back into the mold and the PUR composition is poured over the silicone foam slice. The mold is closed. The PUR composition foams and the mold is opened. The PUR foam is adhered to the silicone foam slice, and the composite article is cut to final dimensions of the respective block.

Adhesion tests of silicone foam were performed in real oven metal sheets and good results were obtained. After 24 hours, silicone foam sticks to metal sheet and provides partial cohesive failure on its adhesion. A standard test was not performed because customer's application of this is not critical since the foam will be encapsulated between metal sheet and PUR/PIR foam backing layer.

Due to its insulation properties and high temperature resistance, the silicone foam insulating layer will bring temperature down to approximately 100° C., in which PUR/PIR foam backing layer can withstand for a long period. The PUR/PIR foam backing layer will dramatically drop this temperature to oven surfaces generating energy savings.

In addition, referring to Table I above, Example 5 provides an excellent combination of properties, including a peak temperature approaching that of glass wool, while having a density lower than silicone foam alone. In addition, the composite article of Example 5 can be formed using automatic or near-automatic processes as opposed to manual processes associated with glass and rock wool. Contact with operators or personnel is also reduced or avoided, contrary to the issues associating with use and handling of the conventional wools.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

ELEMENT LIST article 20
liner 22
oven 24
range 26
stove 28
skin 30
show surface 31
first surface 32
heating cavity 34
second surface 36
insulating layer 38
backing layer 40
outer surface 41
spray nozzle 42

What is claimed is:

1. A hot appliance comprising:
a skin;
a liner that defines a heating cavity; and
a composite article disposed between said skin and said liner, opposite the heating cavity, and covering at least a portion of said liner for insulating said hot appliance, said composite article comprising:
    a backing layer spaced from said liner, with said backing layer comprising a foamed polyurethane (PUR), a foamed polyisocyanurate (PIR), or a foamed PUR/PIR hybrid; and
    an insulating layer sandwiched between said liner and said backing layer, with said insulating layer comprising a foamed room-temperature-vulcanizing (RTV) silicone;
wherein:
    said insulating layer reduces heat transfer from the heating cavity to said backing layer;
    said backing layer is adhered to said insulating layer;
    said insulating layer has a density of from 100 to 500 kg/m$^3$ and a thermal conductivity of from 0.05 to 0.1 W/m·K;
    said backing layer has a density of from 20 to 100 kg/m$^3$ and a thermal conductivity of from 0.005 to 0.04 W/m·K; and
    said insulating layer (IL) and said backing layer (BL) have a combined average thickness ratio (IL:BL) of 1:10 to 1:2.

2. The hot appliance as set forth in claim 1, wherein:
i) said insulating layer has a density of from 200 to 400 kg/m$^3$;
ii) said backing layer has a density of from 30 to 60 kg/m$^3$; or
iii) both i) and ii).

3. The hot appliance as set forth in claim 1, wherein:
i) said insulating layer has a thermal conductivity of from 0.07 to 0.09 W/m·K;
ii) said backing layer has a thermal conductivity of from 0.015 to 0.03 W/m·K; or
iii) both i) and ii).

4. The hot appliance as set forth in claim 1, wherein said insulating layer comprises the reaction product of:
at least one of
    A) an organopolysiloxane having at least two silicon-bonded ethylenically unsaturated groups per molecule, and
    A') an organopolysiloxane having at least two silicon-bonded hydroxy groups per molecule;
    B) an organosilicon having at least two silicon-bonded hydrogen atoms per molecule; and
    C) a catalyst.

5. The hot appliance as set forth in claim 1, wherein said backing layer is a foamed PUR.

6. The hot appliance as set forth in claim 1, wherein said backing layer comprises the reaction product of:
an isocyanate component; and
an isocyanate-reactive component.

7. The hot appliance as set forth in claim 1, wherein:
i) said insulating layer has an average thickness of at least 2 mm and less than 5 cm;
ii) said backing layer has an average thickness of at least 0.4 mm and less than 10 cm; or
iii) both i) and ii).

8. The hot appliance as set forth in claim 1, having an IL:BL of from 1:3 to 1:5.

9. The hot appliance as set forth in claim 1, wherein said insulating layer is adhered to said liner.

10. The hot appliance as set forth in claim 1, wherein said hot appliance is an oven, a stove, a cooktop, a range, a microwave, a dishwasher, a water heater, or a boiler.

11. The hot appliance as set forth in claim 1, wherein:
said liner comprises a metal;
said insulating layer is adhered to said liner; and
said hot appliance is an oven, a stove, a cooktop, a range, a microwave, a dishwasher, a water heater, or a boiler.

12. The hot appliance as set forth in claim 1, substantially free of supplemental insulation adjacent said backing layer opposite the heating cavity.

13. The hot appliance as set forth in claim 1, further defined as a freestanding hot appliance, wherein said skin has a show surface.

14. The hot appliance as set forth in claim 1, further defined as a slide-in hot appliance, wherein said skin comprises or is at least partially defined by one or more of a surrounding wall, a counter, or cabinetry.

15. A method of producing the hot appliance as set forth in claim 1, said method comprising:
providing a skin;
providing a liner that defines a heating cavity;
disposing a composite article between the skin and the liner, opposite the heating cavity, and covering at least a portion of the liner for insulating the hot appliance,
the composite article is formed by:
applying a first composition to the liner to form the insulating layer thereon, the insulating layer comprising a foamed room-temperature-vulcanizing (RTV) silicone; and
applying a second composition to the insulating layer to form the backing layer thereon, the backing layer comprising a foamed polyurethane (PUR), a foamed polyisocyanurate (PIR), or a foamed PUR/PIR hybrid.

\* \* \* \* \*